US012293871B2

(12) United States Patent
Labombard et al.

(10) Patent No.: US 12,293,871 B2
(45) Date of Patent: May 6, 2025

(54) GROOVED, STACKED-PLATE SUPERCONDUCTING MAGNETS AND ELECTRICALLY CONDUCTIVE TERMINAL BLOCKS AND RELATED CONSTRUCTION TECHNIQUES

(71) Applicants: Massachusetts Institute of Technology, Cambridge, MA (US); Commonwealth Fusion Systems LLC, Devens, MA (US)

(72) Inventors: Brian Labombard, Belmont, MA (US); Robert S. Granetz, Newton, MA (US); James Irby, Natick, MA (US); Rui Vieira, Billerica, MA (US); William Beck, Alton Bay, NH (US); Daniel Brunner, Savannah, GA (US); Jeffrey Doody, Melrose, MA (US); Martin Greenwald, Belmont, MA (US); Zachary Hartwig, Jamaica Plain, MA (US); Philip Michael, Cambridge, MA (US); Robert Mumgaard, Boston, MA (US); Alexey Radovinsky, Cambridge, MA (US); Shunichi Shiraiwa, Acton, MA (US); Brandon N. Sorbom, Cambridge, MA (US); John Wright, Melrose, MA (US); Lihua Zhou, Woburn, MA (US)

(73) Assignees: Massachusetts Institute of Technology, Cambridge, MA (US); Commonwealth Fusion Systems LLC, Devens, MA (US)

( * ) Notice: Subject to any disclaimer, the term of this patent is extended or adjusted under 35 U.S.C. 154(b) by 0 days.

(21) Appl. No.: 18/476,886

(22) Filed: Sep. 28, 2023

(65) Prior Publication Data

US 2024/0203628 A1 Jun. 20, 2024

Related U.S. Application Data

(63) Continuation of application No. 17/810,038, filed on Jun. 30, 2022, now Pat. No. 11,810,712, which is a (Continued)

(51) Int. Cl.

| | |
|---|---|
| ***H01F 41/04*** | (2006.01) |
| ***H01F 6/04*** | (2006.01) |
| ***H01F 6/06*** | (2006.01) |

(52) U.S. Cl.

CPC ................. *H01F 6/06* (2013.01); *H01F 6/04* (2013.01); *H01F 41/048* (2013.01)

(58) Field of Classification Search

CPC ..... H01F 6/04; H01F 6/02; H01F 6/06; H01F 41/048

See application file for complete search history.

(56) References Cited

U.S. PATENT DOCUMENTS

| | | | |
|---|---|---|---|
| 1,955,318 | A | 4/1934 | West |
| 2,982,889 | A | 5/1961 | Whearley |

(Continued)

FOREIGN PATENT DOCUMENTS

| | | |
|---|---|---|
| CA | 2 304 633 | 4/1998 |
| CA | 2 374 326 A1 | 1/2001 |

(Continued)

OTHER PUBLICATIONS

Response to Japanese Office Action dated Oct. 18, 2023 for Japanese Application No. 2021-534337; Response filed on Jan. 17, 2024; 20 Pages.

(Continued)

*Primary Examiner* — Mohamad A Musleh

(74) *Attorney, Agent, or Firm* — Daly, Crowley, Mofford & Durkee, LLP

(57) ABSTRACT

Described herein are concepts, system and techniques which provide a means to construct robust high-field supercon- (Continued)

ducting magnets using simple fabrication techniques and modular components that scale well toward commercialization. The resulting magnet assembly—which utilizes non-insulated, high temperature superconducting tapes (HTS) and provides for optimized coolant pathways—is inherently strong structurally, which enables maximum utilization of the high magnetic fields available with HTS technology. In addition, the concepts described herein provide for control of quench-induced current distributions within the tape stack and surrounding superstructure to safely dissipate quench energy, while at the same time obtaining acceptable magnet charge time. The net result is a structurally and thermally robust, high-field magnet assembly that is passively protected against quench fault conditions.

16 Claims, 12 Drawing Sheets

Related U.S. Application Data continuation of application No. 17/345,194, filed on Jun. 11, 2021, now Pat. No. 11,417,464, which is a continuation of application No. 16/959,600, filed as application No. PCT/US2019/068332 on Dec. 23, 2019, now Pat. No. 11,094,439, and a continuation of application No. 16/416,781, filed on May 20, 2019, now abandoned, which is a continuation-in-part of application No. 16/233,410, filed on Dec. 27, 2018, now abandoned, said application No. 16/959,600 is a continuation-in-part of application No. 16/233,410, filed on Dec. 27, 2018, now abandoned.

(56) References Cited

U.S. PATENT DOCUMENTS

| | | | |
|---|---|---|---|
| 3,210,610 | A | 10/1965 | Fraser |
| 3,281,738 | A | 10/1966 | Hanak |
| 3,293,008 | A | 12/1966 | Allen et al. |
| 3,416,111 | A | 12/1968 | Bogner |
| 3,428,925 | A | 2/1969 | Bogner et al. |
| 3,919,677 | A | 11/1975 | Young |
| 3,983,521 | A | 9/1976 | Furuto et al. |
| 4,135,294 | A | 1/1979 | Brown |
| 4,218,668 | A | 8/1980 | Tada et al. |
| 4,344,807 | A | 8/1982 | Dennesen |
| 4,377,905 | A | 3/1983 | Agatsuma et al. |
| 4,586,012 | A | 4/1986 | Koizumi et al. |
| 5,122,772 | A | 6/1992 | Shimamoto et al. |
| 5,231,078 | A | 7/1993 | Riebman et al. |
| 5,331,800 | A | 7/1994 | Schaumburg et al. |
| 5,426,408 | A | 6/1995 | Jones et al. |
| 5,719,106 | A | 2/1998 | Mukai et al. |
| 5,902,774 | A | 5/1999 | Koji et al. |
| 5,914,647 | A | 6/1999 | Aized et al. |
| 6,231,078 | B1 | 5/2001 | Kokeguchi |
| 6,271,474 | B1 | 8/2001 | Fujikami et al. |
| 6,194,985 | B1 | 12/2001 | Tanaka et al. |
| 6,472,966 | B1 | 10/2002 | Ehrhart |
| 6,576,843 | B1 | 6/2003 | Ashworth |
| 6,601,289 | B1 | 8/2003 | Kobayashi |
| 8,437,819 | B2 | 5/2013 | Takayasu et al. |
| 9,183,970 | B2 | 11/2015 | Maeda et al. |
| 10,062,485 | B2 | 8/2018 | Iwasa et al. |
| 10,079,092 | B2 | 9/2018 | Iwasa et al. |
| 10,319,500 | B2 | 6/2019 | Ko et al. |
| 10,332,640 | B2 | 6/2019 | Sykes et al. |
| 10,861,626 | B2 | 12/2020 | Kim et al. |
| 11,094,439 | B2 | 8/2021 | Labombard et al. |
| 11,417,464 | B2 | 8/2022 | Labombard et al. |
| 2005/0127928 | A1 | 6/2005 | Kirby |
| 2006/0071747 | A1 | 4/2006 | Friedman et al. |
| 2006/0077025 | A1 | 4/2006 | Funaki et al. |
| 2013/0255991 | A1 | 10/2013 | Snitchler et al. |
| 2014/0302997 | A1 | 10/2014 | Takayasu |
| 2014/0312999 | A1 | 10/2014 | Oomen |
| 2015/0123760 | A1 | 5/2015 | Meinke et al. |
| 2016/0155541 | A1 | 6/2016 | Jenner et al. |
| 2016/0156174 | A1 | 6/2016 | Kirby et al. |
| 2016/0232988 | A1 | 8/2016 | Sykes et al. |
| 2017/0179364 | A1 | 6/2017 | Schwartz et al. |
| 2017/0338009 | A1 | 11/2017 | Van Der Laan |
| 2018/0158586 | A1 | 6/2018 | Meinke et al. |
| 2018/0164388 | A1 | 6/2018 | Guenter et al. |
| 2018/0261753 | A1 | 9/2018 | Wilson et al. |
| 2019/0385771 | A1 | 12/2019 | Painter |
| 2020/0194153 | A1 | 6/2020 | Brunner |
| 2020/0211744 | A1 | 7/2020 | Labombard et al. |
| 2020/0279681 | A1 | 9/2020 | Radovinsky et al. |
| 2020/0381155 | A1 | 12/2020 | Slade |
| 2021/0350957 | A1 | 11/2021 | Takayasu et al. |
| 2022/0013256 | A1 | 1/2022 | Hubbard et al. |
| 2023/0073419 | A1 | 3/2023 | Labombard et al. |
| 2023/0101820 | A1 | 3/2023 | Radovinsky et al. |
| 2023/0146164 | A1 | 5/2023 | Labombard et al. |

FOREIGN PATENT DOCUMENTS

| | | | |
|---|---|---|---|
| CN | 102867601 | A | 1/2013 |
| CN | 103035354 | | 4/2013 |
| CN | 106 298 149 | A | 1/2017 |
| CN | 109 102 987 | A | 12/2018 |
| EP | 0 667 627 | B1 | 11/1998 |
| EP | 3 499 519 | | 6/2019 |
| GB | 2578307 | A | 5/2020 |
| GB | 2600110 | A | 4/2022 |
| JP | S 54-60476 | A | 5/1979 |
| JP | S54106864 | | 8/1979 |
| JP | S55125601 | | 9/1980 |
| JP | S57108314 | | 7/1982 |
| JP | S 58-40803 | A | 3/1983 |
| JP | S63293801 | | 11/1988 |
| JP | 01-039008 | A | 2/1989 |
| JP | S 64-39008 | A | 2/1989 |
| JP | H 01-143308 | A | 6/1989 |
| JP | H 06-243745 | A | 9/1994 |
| JP | H 02873924 | | 10/1996 |
| JP | H 11-3814 | A | 1/1999 |
| JP | H 11-43308 | A | 2/1999 |
| JP | H11135320 | | 5/1999 |
| JP | 2000277322 | A | 6/2000 |
| JP | 2003 007526 | A | 1/2003 |
| JP | 2008041966 | A | 2/2008 |
| JP | 2008244280 | A | 10/2008 |
| JP | 2009-170550 | A | 7/2009 |
| JP | 2012-195413 | A | 10/2012 |
| JP | 2013080849 | | 5/2013 |
| JP | 2015-012182 | A | 1/2015 |
| JP | 2017-63083 | A | 3/2017 |
| JP | 6180729 | W | 8/2017 |
| JP | 2017175031 | | 9/2017 |
| JP | 2019 102298 | A | 6/2019 |
| KR | 10-0717351 | B1 | 5/2007 |
| KR | 10-1637468 | | 7/2016 |
| WO | WO 01/06524 | | 1/2001 |
| WO | WO 2008/011184 | | 1/2008 |
| WO | WO 2010/042259 | | 4/2010 |
| WO | WO 2011/074092 | A1 | 6/2011 |
| WO | WO 2014/201242 | A1 | 12/2014 |
| WO | WO 2017/042543 | A1 | 3/2017 |
| WO | WO 2020/139832 | | 7/2020 |
| WO | WO 2021/055037 | A2 | 3/2021 |
| WO | WO 2021/055037 | A3 | 3/2021 |
| WO | WO 2021/178697 | | 9/2021 |
| WO | WO 2021/195330 | | 9/2021 |
| WO | WO 2021/195383 | | 9/2021 |
| WO | WO 2021/236185 | | 11/2021 |
| WO | WO 2021/252330 43 | | 12/2021 |
| WO | WO 2021/262319 | | 12/2021 |
| WO | PCT/US2022/030047 | | 5/2022 |
| WO | PCT/US2022/049876 | | 11/2022 |

(56) References Cited

FOREIGN PATENT DOCUMENTS

OTHER PUBLICATIONS

Examination Report Dated Nov. 27, 2023 for Application No. 21719448.9; 4 Pages.
Notice of Allowance dated Jun. 30, 2023 for U.S. Appl. No. 17/810,038; 22 Pages.
U.S. Appl. No. 17/796,481, filed Jul. 29, 2022, Radovinsky, et al.
U.S. Appl. No. 17/919,606, filed Oct. 18, 2022, Radovinsky, et al.
U.S. Appl. No. 17/919,942, filed Oct. 19, 2022, Labombard, et al.
U.S. Appl. No. 18/008,279, filed Dec. 5, 2022, Radovinsky, et al.
Response filed on May 8, 2023 for European Application No. 21719774.8; 13 Pages.
Search Report dated Jul. 15, 2021 for International Application No. PCT/US2021/024079; 33 Pages.
Green, et al.; "The ITER Project: Status and Prospects"; IEEE Transactions on Magnetics; vol. 32; No. 4; Jul. 1996; 6 Pages.
Chen, et al.; "Development of a Digital Quench Detection and Dumping Circuit With Constant Voltage System for SMES"; IEEE Transactions on Applied Superconductivity; vol. 20, No. 3; Jun. 2010; 4 Pages.
Alfaro, et al.; "Vacuum Assisted Liquified Metal (VALM) TSV Filling Method with Superconductive Material"; MEMS 2018; Jan. 21-25, 2018; 4 Pages.
Barth, et al.; "Electro-mechanical properties of REBCO coated conductors from various industrial manufacturers at 77K, self-field and 4.2K, 19T"; Superconductor Science and Technology; Feb. 13, 2015; 11 Pages.
Bauer, et al.; "Review of material properties, past experiences, procedures, issues and results for a possible solder filled cable as Plan B conductor for the EFDA dipole magnet (Draft Vs 1)"; EFDA CSU report LRP 830/07; May 2007; 29 Pages.
Bauer, et al.; "Solder-Filling of A CICC Cable for the EFDA Dipole Magnet"; AIP Conference Proceedings 986, 151; Jan. 2008; 9 Pages.
Bauer; "Development of HTS Current Leads for the ITER Project"; ITER Technical Report, Report No. ITR-18-001; Feb. 28, 2018; 47 Pages.
Bradford et al., "Controllable Critical Current Degradation of ReBCO CC by Post-Manufacturing Deoxygenation", Applied Superconductivity Center, Florida State University, Published Sep. 2019; 21 Pages.
Bruzzone; "Selected Results of Conductor R&D from the SULTAN Test Facility"; Progress in Electromagnetic Research Symposium 2004; Pisa, Italy; Mar. 28-31, 2004; 4 Pages.
Celentano, et al.; "Design of an Industrially Feasible Twisted-Stack HTS Cable-in-Conduit Conductor for Fusion Application"; IEEE Transactions on Applied Superconductivity; vol. 23; No. 3; Jul. 2014; 5 Pages.
Collings, et al.; "Bi:2212/Ag-based Rutherford cables: production, processing and properties"; Superconductor Science and Technology; vol. 12; No. 2; Feb. 1, 1999; 3 Pages.
Dietderich, et al.; "Critical Current Variation as a Function of Transverse Stress of Bi-2212 Rutherford Cables"; IEEE Transactions on Applied Superconductivity; vol. 11; No. 1; Mar. 2001; 3 Pages.
Japanese Request of Examination and Voluntary Amendment with amended claims (with English translation) dated Dec. 15, 2022 for Japanese Application No. 2021-534337; 10 Pages.
Fietz, et al.; "High Current HTS Cables—Status and Actual Development"; IEEE/CSC & ESAS Superconductivity News Forum (global edition); Oct. 18-23, 2015; 43 Pages.
Goldacker, et al.; "Roebel cables from REBCO coated conductors: a one-century-old concept for the superconductivity of the future"; Superconductor Science and Technology; Aug. 13, 2014; 17 Pages.
Goldacker, et al.; Improvement of Superconducting properties in ROEBEL Assembled Coated Conductors (RACC); IEEE Transactions on Applied Superconductivity; vol. 19; No. 3; Jun. 2009; 4 Pages.
Indium Corporation; Data sheet 5RMA-RC and 5RA-RC; Jan. 2019; 8 Pages.
Kario, et al. "Investigation of a Rutherford Cable Using Coasted Conductor Roebel Cables as Strands"; Superconductor Science Technology 26 (2013) 085019 (6pp); http://iopscience.iop.org/0953-2048/26/8/085019; Published on Jul. 4, 2013; 7 Pages.
Li, et al.; "Feasibility Study of the Impregnation of a No-Insulation HTS Coil Using Solder"; IEEE Transactions on Applied Superconductivity; vol. 28, No. 1; Jan. 2018; 5 Pages.
Li, et al.; "Development of a Novel Soldered-Stacked-Square (3S) HTS Wire Using 2G Narrow Tapes With 1 mm Width"; IEEE Transactions on Applied Superconductivity; vol. 27, No. 4; Jun. 2017; 4 Pages.
Liao, et al.; "Signal De-Noising of Quench Detection by Real-Time Wavelet Analysis Algorithm for HTS Coil and Magnet"; IEEE Transactions on Applied Superconductivity; vol. 27, No. 4; Jun. 2017; 5 Pages.
Mei, et al.; "Effects of Cooling Rate on Mechanical Properties of Near-Eutectic Tin-Lead Solder Joints"; Journal of Electronic Materials; vol. 20, No. 8; Feb. 15, 1991; 10 Pages.
Mogro-Campero, et al.; "Degradation of Thin Films of YBa2Cu307 by Annealing in Air and in Vacuum"; Journal of Superconductivity; vol. 8; No. 1; Jan. 1995; 4 Pages.
Markiewicz, et al.; "900 MHz Wide Bore NMR Spectrometer Magnet at NHMFL"; IEEE Transactions on Applied Superconductivity; vol. 10, No. 1; Mar. 2000; 4 Pages.
Nishijima et al., "Mechanical and Transport Characteristic Exploration for Coated Conductors by Hoop Stress Tests;" Physica C.; May 18, 2011; vol. 471, No. 21; 5 Pages.
Office Action dated Aug. 17, 2022 for U.S. Appl. No. 17/291,120; 7 Pages.
Patil, et al.; "Causes of Casting Defects with Remedies"; International Journal of Engineering Research & Technology (IJERT); vol. 4, Issue 11; Nov. 2015; 6 Pages.
PCT International Search Report and Written Opinion of the ISA dated Jun. 25, 2021 for International Application No. PCT/US2021/020916; 15 Pages.
PCT International Search Report and Written Opinion dated Jan. 7, 2022 for International Application No. PCT/US2021/031699; 16 Pages.
PCT International Preliminary Report on Patentability dated May 27, 2022 for International Application No. PCT/US2020/060170; 12 Pages.
PCT International Preliminary Report on Patentability dated Sep. 15, 2022 for International Application No. PCT/US2021/020916; 8 Pages.
PCT International Search Report and Written Opinion dated Jun. 25, 2021 for International Application No. PCT/US2021/024160; 14 Pages.
PCT International Preliminary Report on Patentability dated Oct. 6, 2022 for International Application No. PCT/US2021/024160; 8 Pages.
PCT International Search Report and Written Opinion dated Jun. 9, 2021 for International Application No. PCT/US2021/018962; 17 Pages.
PCT International Search Report and Written Opinion dated Feb. 1, 2022 for International Application No. PCT/US2021/30207; 13 Pages.
PCT International Preliminary Report On Patentability dated Nov. 17, 2022 for International Application No. PCT/US2021/030207; 10 Pages.
PCT International Preliminary Report dated Mar. 25, 2021 for International Application No. PCT/US2021/024079; 11 Pages.
International Preliminary Report on Patentability dated Jan. 5, 2023 for International Application No. PCT/US2021/031699; 10 Pages.
PCT International Preliminary Report on Patentability dated Dec. 1, 2022 for International Application No. PCT/US2021/018962; 11 Pages.
International Search Report and Written Opinion of the ISA dated Jan. 26, 2022 for International Application No. PCT/US2021/020225; 15 Pages.

(56) References Cited

OTHER PUBLICATIONS

International Patent Cooperation Treaty PCT Third Party Observation dated Jul. 7, 2022 for International Application No. PCT/US2021/020225; 4 Pages.
International Communication In Cases For Which No Other Form Is Applicable dated Jul. 7, 2022 for International Application No. PCT/US2021/020225; NPL References; 15 Pages.
Pierro, et al.; "Finite element investigation of the mechanical behaviour of a Twisted Stacked-Tape Cable exposed to large Lorentz loads"; IOP Conf. Series: Material Science and Engineering 279; Jan. 2017; 9 Pages.
Prasad, et al.; "Fabrication of New Joints for SST-1 TF Coil Winding Packs"; Fusion Engineering and Design; www.elsevier.com/locate/fusengdes; Jun. 2013; 5 Pages.
Preuss, et al.; "Critical Current Degradation of Coated Conductors Under Soldering Conditions"; IEEE Transactions on Applied Superconductivity; vol. 28; No. 4; Jun. 2018; 5 Pages.
Restriction Requirement dated Jun. 15, 2022 for U.S. Appl. No. 17/291,120; 7 Pages.
Response to Restriction Requirement dated Jun. 15, 2022 for U.S. Appl. No. 17/291,120, filed Aug. 1, 2022; 1 Page.
Response to Office Action dated Aug. 17, 2022 for U.S. Appl. No. 17/291,120, filed Nov. 17, 2022; 16 Pages.
Search Report and Written Opinion of the ISA for International Application No. PCT/US2020/060170 dated Feb. 16, 2021; 20 Pages.
Sumption, et al.; "Measurements of RRR Variation in Strands Extracted From Nb3Sn-Type Rutherford Cables"; AIP Conference Proceedings 986,277; Mar. 4, 2008; 10 Pages.
Ta, et al.; "Comparison study of cable geometries and superconducting tape layouts for high-temperature superconductor cables"; Cryogenics; Mar. 1, 2018; 7 Pages.
Takayasu, et al.; "Conductor Characterization of YBCO Twisted Stacked-Tape Cables"; IEEE Transactions on Application Superconductivity; vol. 23, No. 3; Jun. 2013; 4 Pages.
Takayasu, et al.; "Present Status and Recent Developments of the Twisted Stacked-Tape Cable Conductor"; IEEE Transactions on Applied Superconductivity; vol. 26; No. 2; Mar. 2016; 10 Pages.
Tsui, et al.; "Soldered Joints—An Essential Component of Demountable High Temperature Superconducting Fusion Magnets"; IOP Publishing, Superconductor Science and Technology; vol. 29, Jan. 2016; 16 Pages.
Uglietti; "A review of commercial high temperature superconducting material for large magnets: from wires and tapes to cables and conductors"; Superconductor Science and Technology; Jan. 2019; 30 Pages.
Uglietti, et al.; "Critical currents versus applied strain for industrial Y-123 coated conductors at various temperatures and magnetic fields up to 19 T", Supercond. Sci. Technol. 19; pp. 869-872; Jul. 5, 2006; 5 Pages.
Van der Laan, et al.; Characterization of a high-temperature superconducting conductor on round core cables in magnetic fields up tp 20 T; Superconductor Science and Technology 26; Feb. 13, 2013; 10 Pages.
Whyte, et al.; "Smaller & Sooner: Exploiting High Magnetic Fields from New Superconductors for a More Attractive Fusion Energy Development Path"; J Fusion Energ (2016) 35:41-53; Jan. 22, 2016; 13 Pages.
Xi, et al.; "Influence of External Magnetic Field on the Critical Current of a Novel HTS Square Wire"; Proceedings of 2018 IEEE International Conference on Applied Superconductivity and Electromagnetic Devices; Apr. 2018; 2 Pages.
Yanagi, et al.; "Feasibility of HTS Magnet Option for Fusion Reactors"; Plasma and Fusion Research: Regular Articles; vol. 9, No. 1405013; Jan. 1, 2014; 6 Pages.
Yanagi, et al.; "Progress of the Design of HTS Magnet Option and R&D Activities for the Helical Fusion Reactor"; IEEE Transactions on Applied Superconductivity, vol. 24, No. 3; Jun. 2014; 5 Pages.
Anwar, et al.; "Direct Penetration of Spin-Triplet Superconductivity into a Ferromagnet in Au/$SrRuO_3$/$Sr_2RuO_4$ Junctions"; Nature Communications; 7:13220; Oct. 26, 2016; pp. 1-7; 7 Pages.
Choi, et al.; "A novel no-insulation winding technique of high temperature-superconducting racetrack coil for rotating applications: A progress report in Korea university"; Review of Scientific Instruments 87; 104704; American Institute of Physics; Oct. 7, 2016; 12 Pages.
Hahn, et al.; "No-insulation multi-width winding technique for high temperature superconducting magnet"; Applied Physics Letters 103, 173511; American Institute of Physics; Oct. 23, 2013; 3 Pages.
Kim, et al.; "Investigation on quench initiation and propagation characteristics of GdBCO coil co-wound with a stainless steel tape as turn-to-turn metallic insulation"; Review of Scientific Instruments 87; 114701; American Institute of Physics; Nov. 2, 2016; 6 Pages.
Minervini, et al.; "Superconducting Magnets Research for a Viable US Fusion Program"; https://fire.pppl.gov/SC_Magnet_Research_White_Paper.pdf; Publication date unknown; Downloaded on Dec. 1, 2018; pp. 1-11; 11 Pages.
PCT International Preliminary Report on Patentability dated Jul. 8, 2021 for International Patent Application No. PCT/US2019/068332; 16 Pages.
PCT International Preliminary Report on Patentability dated Dec. 1, 2022 for International Application No. PCT/2021/033349; 17 Pages.
Response to Rule 161/162 Communication dated Aug. 3, 2021 for European Application No. 19843007.6; Response filed on Jan. 27, 2021; 7 Pages.
Notice of Allowance dated Jun. 30, 2017 for U.S. Appl. No. 15/090,847; 13 Pages.
Notice of Allowance dated Jul. 1, 2020 for U.S. Appl. No. 15/710,895; 9 Pages.
PCT International Search Report and Written Opinion dated Mar. 31, 2020 for International Application No. PCT/US2019/068332; 20 Pages.
Response to U.S. Non-Final Office Action dated Jan. 26, 2017 for U.S. Appl. No. 15/090,847, filed May 25, 2017; 6 Pages.
Response to Non-Final Office Action dated Mar. 17, 2020 for U.S. Appl. No. 15/710,895, filed Jun. 17, 2020; 8 Pages.
Response to Final Office Action dated Oct. 25, 2019 for U.S. Appl. No. 15/710,895, filed Jan. 27, 2020; 6 Pages.
U.S. Non-Final Office Action dated Oct. 20, 2020 for U.S. Appl. No. 10/233,410; 20 Pages.
U.S. Non-Final Office Action dated Oct. 20, 2020 for U.S. Appl. No. 16/416,781; 17 Pages.
U.S. Final Office Action dated Feb. 4, 2021 for U.S. Appl. No. 16/959,600; 15 Pages.
U.S. Non-Final Office Action dated Jan. 26, 2017 for U.S. Appl. No. 15/090,847; 7 Pages.
U.S. Final Office Action dated Oct. 25, 02019 for U.S. Appl. No. 15/710,895; 8 Pages.
U.S. Non-Final Office Action dated Mar. 17, 2020 for U.S. Appl. No. 15/710,895; 9 Pages.
Yazaki et al. "Critical Current Degradation in High-Temperature Superconducting Tapes Caused by Temperature Rise", IEEE Transaction on Applied Superconductivity, vol. 23, No. 3, Published Jun. 2013; 4 Pages.
Response to Non-Final Office Action dated Oct. 20, 2020 for U.S. Appl. No. 16/959,600, filed Jan. 20, 2021; 13 Pages.
Response to Final Office Action dated Feb. 4, 2021 for U.S. Appl. No. 16/959,600, filed May 3, 2021; 10 Pages.
Semba, et al.; "Design and Manufacture of Superconducting Magnet for the Wiggler in Saga-LS"; Proceedings of IPAC'10, Kyoto, Japan; MOPEBO38; May 23, 2010; pp. 358-360; 3 Pages.
U.S. Non-Final Office Action dated Dec. 14, 2021 for U.S. Appl. No. 17/345,194; 11 Pages.
Response to U.S. Non-Final Office Action dated Dec. 14, 2021 for U.S. Appl. No. 17/345,194, filed Mar. 7, 2022; 12 Pages.
Notice of Allowance dated Apr. 12, 2022 for U.S. Appl. No. 17/345,194; 7 Pages.
Response filed on May 2, 2023 for European Application No. 21719448.9; 28 Pages.

(56) References Cited

OTHER PUBLICATIONS

Korean Office Action dated Nov. 2, 2022 for Korean Application No. 10-2021-7021732; 16 Pages.
Korean Amendment with Pending Claims (with English Translation) dated Dec. 29, 2022 for Korean Application No. 10-2021-7021732; 65 Pages.
Korean Final Notice of Preliminary Rejection dated Jan. 10, 2023 for Korean Application No. 10-2021-7021732; 6 Pages.
Korean Notice of Allowance with Allowed Claims in English dated Mar. 21, 2023 for Korean Application No. 10-2021-7021732; 15 Pages.
Examination Report dated May 10, 2023 for European Application No. 19843007.6; 8 Pages.
European Response to Rule 161 EPC dated Feb. 2, 2023 for European Application No. 21811542.6; filed Aug. 9, 2023; 24 Pages.
European Response to Rule 161(1) and 162 EPC dated Jan. 3, 2023 for European Application No. 21732726.1; filed Jul. 2, 2023; 18 Pages.
European Response to Rule 161 EPC dated Nov. 3, 2022 for European Application No. 21719448.9; filed May 2, 2023; 21 Pages.
Japanese Notice of Allowance (with English Translation) dated Apr. 1, 2024 for Japanese Application No. 2021-534337; 9 Pages.
Response to European Communication dated Nov. 27, 2023 for European Application No. 21719448.9; Response filed Mar. 25, 2024; 31 Pages.
PCT International Search Report and Written Opinion dated Apr. 8, 2024 for International Application No. PCT/US2023/083812; 12 Pages.
Korean Office Action (with English Translation) dated Mar. 22, 2024 for Korean Application No. 10-2023-7020578; 6 Pages.
European Intention of grant dated May 24, 2024 for European Application No. 19843007.6, 13 Pages.
Japanese Office Action (with English Translation) dated Oct. 17, 2023 for Japanese Application No. 2021-534337; 12 Pages.
Response to European Rule 161 Communication dated Feb. 2, 2023 for European Application No. 21811542.6; Response filed Aug. 9, 2024; 23 Pages.
European Examination Report dated Aug. 12, 2024 for European Application No. 21732726.1; 5 Pages.
European Examination Report dated May 14, 2024 for European Application No. 21719774.8; 9 Pages.
PCT International Search Report and Written Opinion dated Feb. 29, 2024 for International Patent Application No. PCT/US2023/081302; 19 pages.
PCT International Search Report and Written Opinion dated Mar. 11, 2024 for International Patent Application No. PCT/US2023/081450; 23 pages.
PCT International Search Report and Written Opinion dated Jun. 5, 2024 for International Application No. PCT/US2024/013492; 14 Pages.
Gade, "Conceptual Design of High Temperature Superconducting Toroidal Field Coils for Future Fusion Power Plants;" Dissertation from Karlsruher Institute fur Technologie (KIT); Jan. 1, 2019; 148 Pages.
Mangiarotti, "Design of Demountable Toroidal Field Coils with REBCO Superconductors for a Fusion Reactor;" Paper submitted in partial fulfillment of the requirements for the degree of Doctor of Philosophy in Nuclear Science and Engineering at the Massachusetts Institute of Technology; Feb. 2016; 145 Pages.
Response to European Official Communication dated Aug. 12, 2024 for European Application No. 21732726.1; Response Filed Dec. 2, 2024; 19 Pages.
Extended European Search Report dated Dec. 4, 2024 for European Application No. 24200938.9; 10 Pages.
Japanese Office Action (with Machine English Translation) dated Nov. 28, 2024 for Japanese Application No. 2024-64599; 6 Pages.
Response (with English Translation) to Korean Office Action dated Mar. 22, 2024 for Korean Application No. 10-2023-7020578; Response Filed Jul. 19, 2024; 16 Pages.
Response to European Communication Under Rule 71(3) dated May 24, 2024 for European Application No. 19843007.6; Response Filed Sep. 24, 2024; 13 Pages.
European Examination Report dated Oct. 18, 2024 for European Application No. 21811542.6; 9 Pages).
Japanese Examination Report (with Machine English Translation from Espacenet.com) dated Oct. 21, 2024 for Japanese Application No. 2022-570130; 12 Pages.
U.S. Restriction Requirement dated Sep. 23, 2024 for U.S. Appl. No. 17/919,606; 6 Pages.
Response to U.S. Restriction Requirement dated Sep. 23, 2024 for U.S. Appl. No. 17/919,606; Response Filed Nov. 21, 2024; 2 Pages.
Response to European Examination Report dated May 14, 2024 for European Application No. 21719774.8; Response Filed Sep. 12, 2024; 12 Pages.
European Intention to Grant dated Oct. 9, 2024 for European Application No. 21719448.9; 12 Pages.

Section A-A

Section B-B

Section C-C

GROOVED, STACKED-PLATE SUPERCONDUCTING MAGNETS AND ELECTRICALLY CONDUCTIVE TERMINAL BLOCKS AND RELATED CONSTRUCTION TECHNIQUES

CROSS REFERENCE TO RELATED APPLICATIONS

This application is a continuation of U.S. application Ser. No. 17/810,038 filed Jun. 30, 2022, which is a continuation of U.S. application Ser. No. 17/345,194 filed Jun. 11, 2021, now U.S. Pat. No. 11,417,464, which is a continuation of U.S. application Ser. No. 16/959,600 filed Jul. 1, 2020, now U.S. Pat. No. 11,094,439. U.S. application Ser. No. 16/959,600 is a National Stage of International Application PCT/US2019/068332 filed Dec. 23, 2019, and is a continuation of U.S. application Ser. No. 16/416,781 filed May 20, 2019, and is a continuation-in-part of U.S. application Ser. No. 16/233,410 filed Dec. 27, 2018. U.S. application Ser. No. 16/416,781 is a continuation-in-part of U.S. application Ser. No. 16/233,410 filed Dec. 27, 2018. The contents of the above-referenced applications are hereby incorporated by reference as if fully set forth herein.

BACKGROUND

As is known in the art, existing approaches for fabrication of high-field superconducting magnetics include: (1) low temperature superconductor (LTS) cable-in-conduit conductor (CICC) designs, such as is being employed for ITER's toroidal field magnetics; and (2) high temperature superconductor (HTS) designs based upon HTS tapes wound directly into layer-wound coils or spiral-wound "pancake" coil assemblies. CICC-like approaches based upon HTS conductors are also being pursued.

In the CICC approach, a conduit is electrically insulated from a winding pack. Coolant is constrained to flow inside of a conduit. The shape of the winding pack and an external support shell define a shape of the electrical current pathway and coolant pathway. For the example of the ITER toroidal field coils, the winding pack and an external support shell are provided having a D-shape. The winding pack and external shell structures are primarily responsible for containing Lorentz forces generated by the high-field magnets (i.e. the winding pack and shell must support the Lorentz loads). In the case of a magnet quench event (which must be detected reliably and with enough lead time to mitigate damage via external protection systems), the stored magnetic energy is dumped into external resistors at the magnet terminals. Thus, current in the CICC bypasses normal zones in the superconductor, flowing instead into a copper stabilizer.

The need to have a copper stabilizer and a coolant channel in the conduit, combined with the need for high voltage electrical insulation, complicates the magnet design since these elements are structurally weak, yet they occupy significant volume in the winding pack. Additionally, the fabrication process for CICC-based magnetics is long and arduous involving many steps, including: cabling of the strands/tapes, jacketing these sub-elements together, and bending and inserting the CICC into a winding pack.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

Described herein are concepts, systems, structures and techniques which provide a means to construct robust high-field superconducting magnets using fabrication techniques which are relatively simple compared with prior art fabrication techniques and modular components that scale well toward commercialization. The resulting magnet assembly—which utilizes non-insulated, high temperature superconducting tapes (HTS) and provides for enhanced (and ideally, optimized) coolant pathways—is inherently strong structurally. This enables a high degree of utilization (and ideally, maximum utilization) of the high magnetic fields available with HTS tape technology. In addition, the concepts described herein provide for control of quench-induced current distributions within a tape stack and surrounding superstructure to safely dissipate quench energy, while at the same time obtaining acceptable magnet charge time. The net result is a structurally and thermally robust, high-field magnet assembly that is passively protected against quench fault conditions.

In embodiments, the concepts described may facilitate commercialization of high-field magnets for use in fusion power plants (e.g. compact fusion power plants) as well as in high-energy physics applications. However, after reading the description provided herein, one of ordinary skill in the art will readily appreciate that the disclosed concepts are generally applicable for use in a wide range of other applications (e.g. a wide range of industrial uses) which may make use of high-field magnets. Such applications include but are not limited to: applications in the medical and life sciences field (e.g. magnetic resonance imagingand spectroscopy); applications in the chemistry, biochemistry and biology fields (e.g. nuclear magnetic resonance (NMR), NMR spectroscopy, electron paramagnetic resonance (EPR), and Fourier-transform ion cyclotron resonance (FT-ICR)); applications in particle accelerators and detectors (e.g., for use in health care applications such as in instruments for radiotherapy); applications in devices for generation and control of hot hydrogen plasmas; applications in the area of transportation; applications in the area of power generation and conversion; applications in heavy industry; applications in weapons and defense; and applications in the area of high energy particle physics.

In accordance with one aspect of the concepts describe herein, a high-field magnet assembly includes a plurality of electrically conductive plates with each of the plurality of electrically conductive plates having spiral-grooves provided therein with said plurality of electrically conductive plates disposed (e.g. stacked) to form a monolithic pancake assembly having a first outermost surface and a second, opposing outermost surface. The high-field magnet assembly further includes a non-insulated (NI) HTS tape stack disposed in a channel formed by the grooves of said first and second electrically conductive plates. In embodiments, the HTS stack may include co-wind materials which may comprise one or a combination of non-insulated, insulated or semiconducting materials. In embodiments, the channel may be suitably sized to contain more than one stack, with separate structures placed between stacks that can optionally engage with the plates mechanically. The channel has a first opening on the first outermost surface of the pancake assembly and a second opening on the second, opposite outermost surface of the pancake assembly. The NI HTS tape (and co-wind stack, when included) is continuously disposed in the channel such that the NI HTS tape (and co-wind stack) forms a path from the first outer-most surface of the pancake assembly to the second, opposite outer-most surface of the pancake assembly.

In embodiments a pair of spiral-grooved plates (e.g. a top plate and a bottom plate) are stacked to form a monolithic double-pancake assembly.

In embodiments, two identical spiral-grooved plates are assembled back-to-back with an insulating material inserted or otherwise disposed therebetween. One or more HTS tape stacks with co-wind are disposed into the groove which executes an in-going spiral on the top plate, a helix down to the bottom plate, and an out-going spiral on the bottom plate.

In embodiments, the high-field magnet assembly can include co-wind materials and surface coatings selected to provide a desired (and ideally, an optimized) magnet quench behavior.

In embodiments, the high-field magnet assembly can include spiral-grooved plates provided from a composite of base materials and surface coatings (electrically insulating, electrically conducting and/or electrically semiconducting) selected to provide a desired (and ideally, an optimized) magnet quench behavior.

In embodiments, a bladder element can also be included in the tape stack to preload the stack prior to soldering or to eliminate the need for soldering.

In embodiments, a bladder element can be filled with a material that is liquid during assembly but is solid at magnet operating temperatures. The heat of fusion associated with this material can act a large thermal reservoir to protect the HTS during a quench event.

In embodiments, a copper spiral cap can be soldered or otherwise coupled or secured to the tape bundle to help facilitate heat removal to coolant channel plates, which are stacked on top of the spirals.

In embodiments, grooves can be cut in the copper spiral cap and top surface of the baseplate, along and/or across the path of the spiral winding, to facilitate coolant passageways.

In embodiments, a copper interconnection between in-going and out-going spiral-grooved pancakes may be used. This can be employed at both the inside diameter (ID) and outside diameter (OD) of each spiral-groove winding plate. In this case, a magnet assembly may be constructed by simply stacking a series of spiral-grooved, HTS-loaded plates against each other, interleaved with coolant channel plates and/or using coolant channel grooves cut into the surfaces of the plates as described above.

In embodiments, the HTS and co-wind stack is embedded in a matrix of copper or other high electrical conductance material at the point at which it enters and exits the spiral-grooved winding plate and at the point at which the stack transitions from one spiral-grooved winding plate to another. This serves to protect against overheating and damage of the HTS during magnet charging and magnet quench conditions.

In another aspect of the concepts described herein, a stacked-plate magnet assembly comprises a first plate, a second plate disposed over the first plate, an electrically insulating material disposed between the first and second plate, and one or more HTS tape stacks that each may include co-wind materials (electrically conducting, electrically insulating and/or semiconducting). The first plate is provided having at least one spiral-shaped groove provided therein. The second plate is also provided having at least one spiral groove provided therein such that when a first surface of the first plate is disposed over a first surface of the second plate, said grooves form a channel having an in-going spiral shape on the first plate, a helix down to the second (or bottom) plate, and an out-going spiral on the bottom plate. The electrically insulating material is disposed between the first and second plates. The HTS tape stack(s) with co-wind is disposed in the channel to this provide the winding having a spiral shape. It should be appreciated that while the winding will be generally spiral-shaped, the magnet core may be provided having a D-shape, a solenoid shape, a circular shape or any other shapes suitable for the application in which it will be used. Similarly, the helical channel can be deformed into the shape needed to facilitate a continuous channel that allows the HTS tape stack to pass from the first plate to the second plate. After reading the description provided herein, one of ordinary skill in the art will appreciate how to select a winding and magnet shapes appropriate for the needs of a particular application.

In an embodiment, the grooves in the first and second plates are substantially identical. The first and second plates can also have substantially identical spiral-shaped grooves and can be assembled back-to-back.

The channel forms an in-going spiral on the top plate, a helix down to the bottom plate, and an out-going spiral on the bottom plate. The HTS tape stack(s) that may include co-wind materials can be inserted into the grooved channel. The co-wind materials and surface coatings can be selected to optimize magnet quench behavior.

In embodiments, a bladder element can be included as a co-wind material in the HTS tape stack. The bladder element can be configured in the HTS tape stack to preload the HTS tape stack prior to soldering. In embodiments, the bladder element can also be configured in the HTS tape stack to eliminate the need for soldering. The bladder element can also be configured to pre-compress the HTS tape stack against a load-bearing sidewall of at least one spiral groove.

In embodiments, the bladder element can be filled with a material that is liquid during assembly but is solid at magnet operating temperatures. One such material includes, but is not limited to, gallium. The heat of fusion associated with this material can act a large thermal reservoir to limit the temperature rise of the HTS during a quench event.

In embodiments, the number, size and type of HTS tapes in the stacks with optional co-wind materials can be varied according to location along the spiral pathway, if desired, such as to save cost and/or to optimize magnet quench response.

The magnet can further comprise at least one coolant channel. In embodiments, at least one coolant channel may be provided in one or both of the first and second plates. In embodiments, the coolant channel can comprise one or more coolant pathways that run along the HTS tape stack. In other embodiments, at least one coolant channel can comprise one or more cooling channel plates interleaved with one or both of the first plate and second plate or interleaved in a stack of such plates that may comprise a magnet assembly. In such embodiments, the coolant channel path need not run along the HTS tape stack. In some embodiments, coolant channels are formed by cutting grooves in the surfaces of the plates, including a copper cap that is placed over the HTS tape stack. Such coolant channel grooves need not run along the HTS tape stack.

The magnet can also comprise an electrically conductive plate disposed between the first and second plates or interleaved in a stack of such plates that may comprise a magnet assembly. The electrically conductive plate may be provided from any electrically conductive material including, but not limited to, copper. The electrically conductive plate may also be provided from a thermally conductive material and may be configured to provide conduction cooling.

Additionally, the magnet can comprise one or more electrical interconnections between the first and second plates with such one or more electrical interconnections configured to establish and maintain a high electrical resistance in some areas in order to minimize the flow of bypass currents between each of the winding plates during magnet charging.

In another aspect, a method for constructing a high-field magnet comprises assembling a series of HTS-loaded spiral-grooved plates, stacked between coolant channel plates; and forming one or more inter-pancake electrical connections, each of the one or more inter-pancake connections having a low electrical resistance characteristic. Forming one or more inter-pancake connections can comprise forming one or more inter-pancake connections automatically.

The method can further comprise pre-loading HTS tape stacks in the spiral-grooved plates to eliminate a need for soldering.

In another aspect of the concepts described herein, a magnet assembly includes a first electrically conductive plate having a first surface with a plurality of grooves provided therein, the grooves defined by one or more walls with at least two grooves of the plurality of grooves having a different width and a non-insulated (NI) high temperature superconductor (HTS) tape stack having a length such that said NI HTS tape stack may be disposed in the plurality of grooves such that the NI HTS tape stack forms a continuous path between an outer-most groove in the first electrically conductive plate and an innermost groove of the first electrically conductive plate. In embodiments, the HTS tape is configured in each groove such that in response to generated forces, the HTS tape stack distributes forces into the first and second electrically conductive plates.

In embodiments, the magnet assembly further includes a second electrically conductive plate disposed over the first plate, such that when a first surface of the first plate is disposed over the first surface of the second plate, the grooves form a channel having an opening at a first end thereof and the HTS tape forms a continuous path between the first and second electrically conductive plates.

In embodiments, the HTS tape stack is disposed within one of the plurality of grooves of varying widths and is wound against itself to occupy the width of the groove.

In embodiments, the walls which define the grooves in the first electrically conductive plate are provided having a variable wall thickness such that a thickness of a first portion of a wall is different from a thickness of a second portion of the same wall.

In embodiments, the walls which define the grooves in the first electrically conductive plate are provided having different wall thickness.

In embodiments, a thickness of a first portion of a first wall in a first radial direction as measured from a center of the first electrically conductive plate differs from a thickness of a first portion of a second, different wall along the same first radial direction.

In embodiments, the first and second electrically conductive plates have substantially identical spiral-shaped grooves.

In embodiments, the NI HTS tape stack is comprised of two or more NI HTS tape stacks joined by a low resistance electrical connection.

In embodiments, the materials comprising the NI HTS tape stack in the first and second plates are continuous across the plates.

In embodiments, the NI HTS tape stack further comprises a co-wind material disposed in the groove such that the NI HTS tape and co-wind stack follows a path between a first outer-most groove of the first electrically conductive plate and an innermost groove of the first electrically conductive plate wherein the HTS tape and co-wind stack are configured in the grooves such that in response to generated forces, the HTS tape and co-wind stack distribute forces into the first and second electrically conductive plates.

In embodiments, the co-wind material is provided as one or more of: an electrically conducting material; an electrically insulating material and/or an electrically semiconducting material.

In embodiments, the co-wind materials are selected to optimize magnet quench behavior, or magnet charging behavior, or both.

In embodiments, the HTS tape and co-wind stack are embedded in a matrix of high electrical conductivity material at points where: the HTS tape and co-wind stack passes between stacked plates; the HTS tape and co-wind stack enters into and exit from the magnet assembly; and electrical interconnections are formed between windings.

In embodiments, the co-wind material varies in either composition or thickness along a length of the NI HTS tape stack.

In embodiments, an electrically insulating material is placed at selected areas between the stacked plates.

In embodiments, the NI HTS tape stack comprises one or more HTS tapes and the number, size and type of HTS tapes in said NI HTS tape stack varies along a length of said NI HTS tape stack.

In embodiments, the groove defines an in-going spiral on the first electrically conductive plate, the in-going spiral having a first end and a second end, and the first electrical plate has a helical opening provided therein, the helical opening having a first end and a second end with the first end of the helical opening coupled to the second end of the in-going spiral and a second end of the helical opening which leads to the to the second electrically conductive plate and coupled to a first end of an out-going spiral provided in said second electrically conductive plate.

In embodiments, a bladder element is included in the HTS tape stack. In embodiments, the bladder element is configured to pre-compress the HTS tape stack against a load-bearing sidewall of the at least one spiral groove. In embodiments, the bladder element contains a material that is liquid or gaseous during magnet assembly and solid or liquid or gaseous or evacuated during magnet operation. In embodiments, the bladder element contains a material that exhibits a phase change from solid to liquid and/or liquid to gas during magnet operation.

In embodiments, the first conductive plate has at least one coolant channel provided therein. In embodiments, the coolant channel comprises one or more coolant pathways disposed along said HTS tape stack. In embodiments, the at least one coolant channel comprises one or more cooling channel plates interleaved with one or both of the first plate and second electrically conductive plates. In embodiments, the at least one coolant channel comprises one or more coolant pathways disposed along a path that is different from that of the HTS tape stack.

In embodiments, a conducting plate may be inserted between the first and second electrically conductive plates.

In embodiments, high electrical conductivity coatings may be disposed on selected locations of at least one of the first and second electrically conductive plates.

In embodiments, the conducting plate comprises copper in whole or in part.

Some embodiments relate to an apparatus, comprising: an electrically conductive plate having a groove; and a high-temperature superconductor (HTS) tape stack disposed in the groove, the HTS tape stack having a spiral shape.

The groove may have a spiral shape.

The electrically conductive plate may comprise a metal or a metal alloy.

The apparatus may further comprise a coolant channel.

The coolant channel may be disposed in the groove.

The coolant channel may be disposed outside the groove.

The HTS tape stack may be a non-insulated HTS tape stack.

The HTS tape stack may comprise a plurality of turns, wherein the electrically conductive plate provides electrical connections between respective turns of the plurality of turns.

The apparatus may further comprise a shim or a bladder in the groove.

The electrically conductive plate may be a first electrically conductive plate, the groove may be a first groove, and the HTS tape stack may be a first HTS tape stack, and the apparatus may further comprise: a second electrically conductive plate having a second groove; and a second HTS tape stack disposed in the second groove, the second HTS tape stack having a spiral shape, wherein the first HTS tape stack is electrically coupled to the second HTS tape stack.

The first electrically conductive plate may be electrically insulated from the second electrically conductive plate.

The first and/or second electrically conductive plates have one or more alignment structures to align the first and second electrically conductive plates when the first and second electrically conductive plates are mated together.

The apparatus may further comprise a conductive connection between the first HTS tape stack and the second HTS tape stack.

The conductive connection may comprise a high temperature superconductor or a metal that is not a superconductor at a temperature above 30 degrees Kelvin.

The conductive connection may comprise copper.

The conductive connection may be formed between innermost turns of the first and second HTS tape stacks or between outermost turns of the first and second HTS tape stacks.

The first HTS tape stack and the second HTS tape stack may be a same HTS tape stack.

A transition between the first HTS tape stack and the second HTS tape stack may be formed by a helical portion of the same HTS tape stack.

The first groove may comprise at least first and second turns, wherein the first turn has a first width and the second turn has a second width, wherein the second width is greater than the first width.

The second turn of the groove may comprise a plurality of turns of the HTS tape stack.

The apparatus may comprise a magnet.

The HTS tape stack may comprise a rare-earth oxide.

The HTS tape stack may comprise comprises rare-earth barium copper oxide.

The apparatus may further comprise a conductive terminal block electrically coupled to the HTS tape stack.

Some embodiments relate to a fabrication method, comprising: forming an electrically conductive plate having a groove; and disposing a high-temperature superconductor (HTS) tape stack into the groove in a spiral shape.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1A:
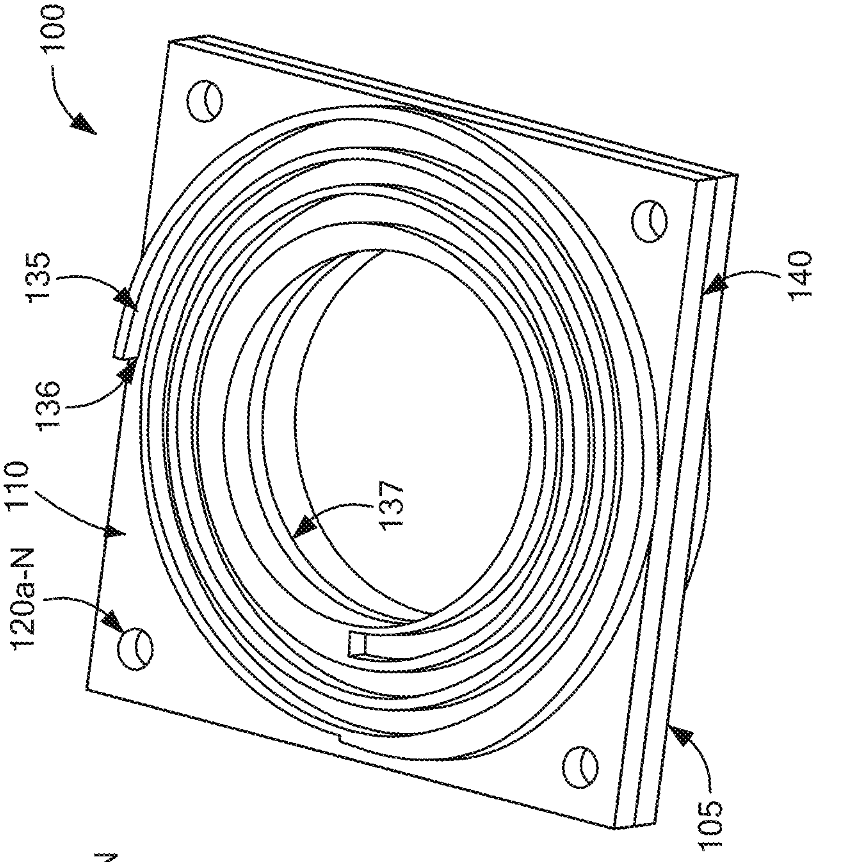
FIG. 1A is an isometric view of a portion of a spiral-grooved, stacked-plate, double-pancake magnet assembly which may be the same as or similar to the spiral-grooved, stacked-plate, double-pancake magnet assembly shown in FIG. 1C.

Described herein are concepts and techniques for providing a high-field magnet. Described herein are structures and techniques for the design and construction of high-field magnets having a relatively compact size and shape. The described concepts, structures and techniques provide a means to construct robust high field superconducting magnets using fabrication techniques which are relatively simple compared with prior art high-field magnet fabrication techniques. Furthermore, the described concepts, structures and techniques can utilize modular components that scale well toward commercialization. The described high-field magnet assemblies may utilize spiral-grooved stacked-plates and non-insulated, high temperature superconducting (HTS) tapes. Non-insulated tapes allow current to flow from turn to turn of the tape outside of the superconductor, and may be, but need not be, free of insulating material. Such an approach can result in magnet assemblies which are inherently strong structurally, which enables high (and ideally, maximum) utilization of the high magnetic fields available with HTS technology. Furthermore, the use of spiral-grooved stacked-plates and non-insulated, HTS tape stack(s) (or HTS tape and co-wind stack(s) with conducting, non-conducting and/or semiconducting materials) disposed within the spiral groove can allow for inclusion of coolant pathways, which in some cases may be optimized coolant pathways.

An HTS tape includes a HTS material. As used herein, the phrase "HTS materials" or "HTS superconductors" refers to superconducting materials having a critical temperature above 30 K at self field. Examples of HTS superconductors include rare-earth oxides, such rare-earth barium copper oxide (REBCO), but are not limited thereto.

An HTS self-wound pancake assembly is provided. The HTS tapes themselves (including an optional co-wind) in conjunction with the spiral grooved plate provide the mechanical strength needed to generate high magnetic fields. In embodiments, the spirals naturally favor a circular geometry. As a result of the HTS tapes themselves providing the requisite mechanical strength, such coils are easy to construct and are mechanically strong. For example, an 8 tesla double-pancake non-insulated (NI) HTS tape coil was designed, constructed and successfully operated in less than 6 months. In some embodiments, the NI HTS tape (and co-wind stack when used) forms a continuous path from the first outer-most surface of the pancake assembly to the second, opposite outer-most surface of the pancake assembly. It should, however, be appreciated that in some embodiments, the path of one material may be broken and not continuous. Thus, it should be appreciated that the grooved path is more or less continuous but the material disposed in the grooved path may not be.

The NI HTS pancakes are particularly interesting since they have a unique current sharing characteristic/phenomenon during magnet quench. Specifically, since the HTS tapes (or tape stacks) are not insulated or only partially insulated, joule heating may be distributed more or less uniformly throughout the winding. It is desirable to optimize and fully exploit this behavior by devising a robust, passively protected magnet design that can operate at high energy density. The spiral-grooved plate assembly configuration described herein can control the distribution quench-driven currents within the coil structure and reduce (and ideally, minimize) the magnitude and duration of current-sharing currents, and therefore joule heating and temperature rise, of the HTS tape stack itself. Furthermore, the current is electromagnetically coupled to the spiral-grooved plates and other surrounding structures which, by careful choice of magnet design, can further lead to uniform current distribution and reduced temperature rise due to joule heating since the magnetic field energy can be dissipated in a much larger volume of material compared with prior art techniques.

In addition, the described concepts, structures and techniques provide for control of quench-induced current distributions within an HTS tape stack and surrounding superstructure so as to safely dissipate quench energy, while at the same time obtaining acceptable magnet charge time. The net result is a structurally and thermally robust, high-field magnet assembly that is passively protected against quench fault conditions.

Although reference is sometimes made herein to the use of such high-field magnet assemblies in connection with fusion power plants (e.g. compact fusion power plants) and fusion research experiments (e.g. SPARC), such references are not intended to be, and should not be construed as, limiting. It is appreciated that high-field magnet assemblies provided in accordance with the concepts described herein find use in a wide variety of applications including, but not limited to applications in the area of high-energy physics, applications in the area of medical and life sciences, applications in the areas of chemistry, biochemistry and biology, applications in the areas of particle accelerators and detectors, applications in the area of devices for generation and control of hot hydrogen plasmas, applications in the area of transportation, applications in the area of power generation and conversion, applications in heavy industry, applications in weapons and defense, and applications in the area of high energy particle physics.

For example, in the medical and life sciences field, high-field magnets provided in accordance with the concepts described herein may find use in magnetic resonance imaging (MRI) and spectroscopy. In the chemistry, biochemistry and biology fields, high-field magnets provided in accordance with the concepts described herein may find use in nuclear magnetic resonance (NMR), NMR spectroscopy, electron paramagnetic resonance (EPR), and Fourier-transform ion cyclotron resonance (FT-ICR). In the area of particle accelerators and detectors, high-field magnets provided in accordance with the concepts described herein may find used in health care applications such as in instruments for radiotherapy and in charge particle beam delivery (e.g., from accelerator to target/patient). In the area of transportation, high-field magnets provided in accordance with the concepts described herein may find use in high power density motors, generators and MHD propulsion (e.g. electric aircraft, maglev trains, hyperloop concepts, railroad engines and transformers, marine propulsion and generators, and vehicles). In the area of utility and power applications, high-field magnets provided in accordance with the concepts described herein may find use in electromechanical machinery, power generation and power conversion systems (e.g. wind generators, transformers, synchronous condensers, utility generators such as those producing up to or greater than 300 MW, superconducting energy storage, and MHD energy generation). High-field magnets provided in accordance with the concepts described herein may find use in the area of heavy industrial applications (e.g., large industrial motors, magnetic separation, disposable mixing systems, induction heaters). In the area of weapons and defense applications, high-field magnets provided in accordance with the concepts described herein may find use in propulsion motors and generators, ElectroMagnetic Pulse (EMP) generation, directed energy weapon power supplies, and rail-guns/coil-guns.

Reference is sometimes made herein to one or more HTS tape stacks or HTS stack(s) and co-wind being disposed in a spiral groove or channel. It should be appreciated that as used herein, the term "HTS tape stack" includes a "stack" having multiple layers of HTS tape or only a single layer of HTS tape and possibly including one or more tapes made of non-HTS materials, which are herein referred to as being 'co-wind' tapes. The number, size and type of tape layers to use in any particular HTS tape stack are selected in accordance with the needs of a particular application. For example, in applications which only require a low current capability and can accept a high inductance characteristic, a single layer tape stack may be used. However, in high current/low inductance applications (e.g. compact fusion applications), an HTS tape stack provided from a single layer or a plurality of individual layers, up to many individual layers of HTS tape (e.g. in the range of 10-1000 layers, or more) may be used. In the case where are plurality of HTS tape layers are included in an HTS tape stack, the multiple layers of HTS tape are essentially coupled in parallel to provide a structure having an increased current carrying characteristic relative to a single HTS tape layer.

Figure 1:
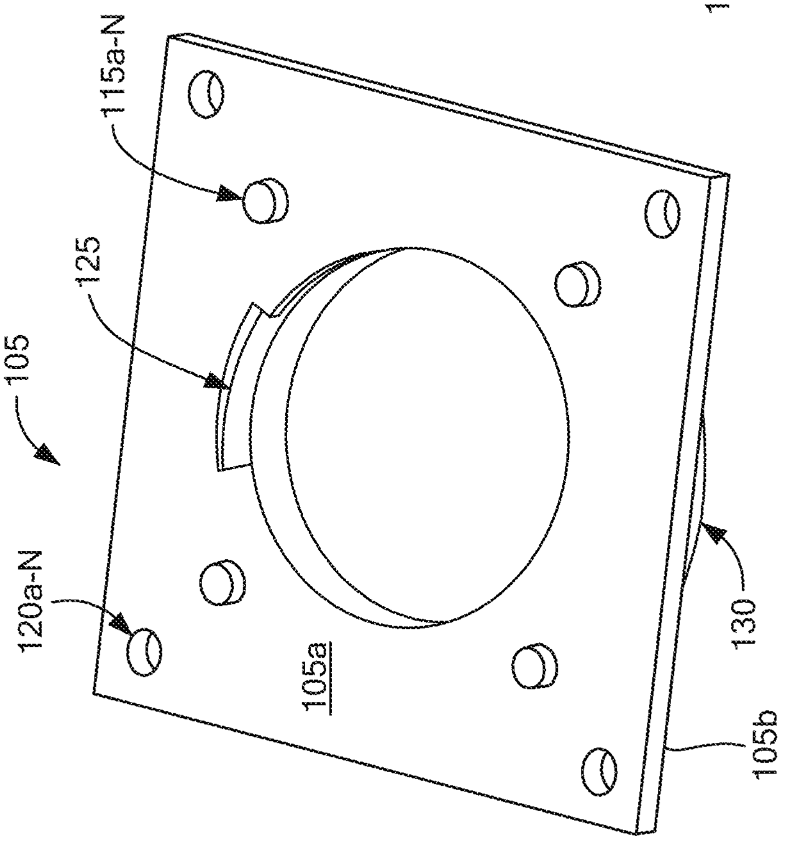
FIG. 1 is an isometric view of a portion of a spiral-grooved, stacked-plate, double-pancake magnet assembly which may be the same as or similar to the spiral-grooved, stacked-plate, double-pancake magnet assembly shown in FIG. 1C.
Figure 1C:
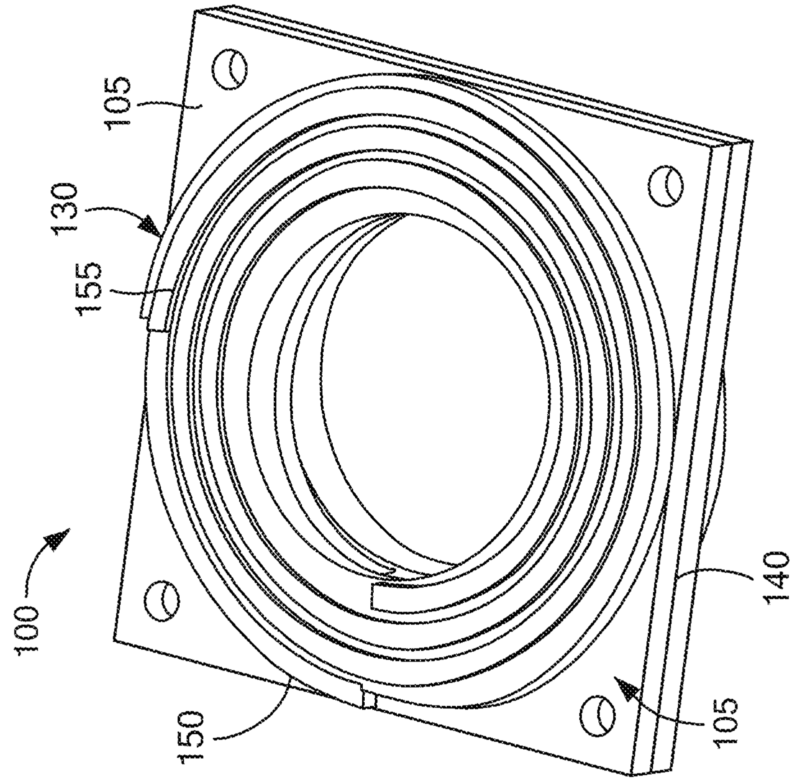
FIG. 1C is an isometric view of a spiral-grooved, stacked-plate, double-pancake magnet assembly.

Referring now to FIGS. 1-1C in which like elements are provided having like reference designations throughout several views, the series of views illustrates the use of a spiral-grooved, stacked-plate concept used to form a so-called monolithic "double-pancake assembly" 100 (FIG. 1A). It should be appreciated that to promote clarity in the description and drawings, details of current lead connections have been omitted.

In general overview, FIGS. 1-1C illustrate an example of spiral-grooved plates which may be stacked to form a monolithic so-called "double-pancake" assembly 100. In this illustration, two (optionally identical) spiral-grooved plates (FIG. 1) are assembled back-to-back with an insulating material inserted or otherwise disposed therebetween (FIG. 1A). An HTS tape stack that may include co-wind materials is inserted into the grooved channel (FIG. 1B), which may execute an in-going spiral on the top plate, a helix down to the bottom plate, and an out-going spiral on the bottom plate. In some embodiments, the HTS tape stack is continuously wound (i.e. without breaks or segmentation) from a top surface to a bottom surface of the pancake assembly. In some embodiments, the NI HTS tape (and co-wind stack when used) may be segmented or otherwise have breaks provided therein (e.g. the path of one material may be broken and not continuous). It should thus be appreciated that while the grooved path may be described as more or less continuous (even though the cross-sectional shape may change throughout the length of the grooved path), the material loaded or otherwise disposed in the grooved path may be continuous or may be provided in parts (e.g. segmented). In some embodiments, more than one HTS tape stack may be disposed into the groove, with a material disposed between stacks that may engage mechanically with the plate, such as via spiral grooves, separately or in conjunction with the tape stacks. In some embodiments, some or all of the co-wind materials may be disposed to engage with the plate mechanically, such as via spiral grooves, separately or in conjunction with the tape stacks.

The co-wind materials and surface coatings can be chosen to provide a desired (and ideally, an optimized) magnet quench behavior. In embodiments, a bladder element can also be included in the tape stack to preload the stack prior to soldering or to eliminate the need for soldering. A copper (or other high thermal conductivity material) spiral cap (FIG. 1C) can be soldered or otherwise coupled or secured to the tape bundle to help facilitate heat removal to coolant channel plates, which are stacked on top of the spirals (see FIGS. 3 and 6 to be described in detail below). Another embodiment uses a copper interconnection between in-going and out-going spiral-grooved pancakes (see FIG. 3). This can be employed at both the inside diameter (ID) and outside diameter (OD) of each spiral-grooved winding plate. In this case, a magnet assembly may be constructed by simply stacking a series of spiral-grooved, HTS-loaded plates against each other, interleaved with coolant channel plates (e.g. similar to that shown and described in conjunction with FIG. 6 below, but with the external connections between double pancakes eliminated). Depending on application, coolant channel plates may be replaced by conduction cooling plates or eliminated altogether.

The illustrative stacked-plate, double-pancake magnet assembly 100 (FIG. 1A) includes a first plate 105 (FIG. 1) having first and second opposing surfaces 105*a*, 105*b* and a groove 125. First plate 105 may be include or be formed from any electrically conductive material including metals or alloys, for example. Such materials include, but are not limited to, one or more of nickel-based super alloys such as Inconel 718 and Hastelloy C276, austenitic stainless steels, and dispersion hardened copper alloys. Factors that influence material selection include, but are not limited to: mechanical strength, electrical conductivity, thermal conductivity, and coefficients of thermal expansion. A composite of different materials may be employed. Materials may be selected to optimize uniformity of quench energy deposition, structural integrity under load and under off-normal conditions and to minimize cost. Additive manufacturing techniques can be readily employed to fabricate the plate geometries employed, from which a magnet can be constructed.

Groove 125 is provided which may have at first a helical shape as it enters the plate and then a spiral shape within the plate. In this illustrative embodiment, the spiral is provided as a curved spiral (i.e. a winding in a substantially continuous and radially widening or tightening curve either around a central point on a flat plane or about an axis so as to form a column). It should, of course, be appreciated that in other embodiments a spiral-like shape may be used (i.e. a winding in a generally widening or tightening path either around a central point on a flat plane or about an axis). As used herein, the term "spiral shape" includes "spiral-like" shapes. For example, in some embodiments, it may be desirable or necessary to utilize a rectangular spiral-like shape. In still other embodiments it may be desirable or necessary to utilize a triangular spiral-like shape. In still other embodiments it may be desirable or necessary to utilize an oval spiral-like shape. Other spiral-like shapes including geometrically irregular shapes may also be used. After reading the disclosure provided herein, those of ordinary skill in the art will appreciate how to select the particular spiral or spiral-like geometry/shape to use in a particular application. It should also be appreciated that the spiral or spiral-like groove may be provided having a constant pitch (i.e. the same pitch) or may be provided having a variable pitch. A variable pitch can provide significant design flexibility, for example, providing space between windings to accommodate coolant passageways between pancake plates, and/or increasing the strength of the pancake in certain areas while reducing total magnet weight and/or providing more uniform quench energy deposition.

The first plate 105 includes optional interface apertures 120*a*-N which are included in this illustrative embodiment to aid in securing the first plate 105 to a second plate (e.g., the second plate 110 of FIG. 1A). In some embodiments, the securing may be performed with conventional fasteners as is generally known. In embodiments, other fastening techniques may be used to join or otherwise secure two or more plates. Such techniques include, but are not limited to welding, soldering and brazing. Features can be added to the plate to accommodate fastening techniques used in a commercial production environment, including but not limited to: weld lips, flanges, weld reliefs, tapped holes, rivets and special fastening points.

As will become apparent from the description herein below, groove 125 (FIG. 1) is configured in this embodiment to receive a high temperature superconductor (HTS) tape stack (e.g., the HTS tape stack 150 of FIG. 1C). The HTS tape stack may be composed entirely of HTS tapes or may include 'co-wind' tapes, that is, tapes made entirely of non-HTS materials, interleaved and/or stacked separately on top of a stack of HTS tapes. Co-wind materials can be conducting, insulating or a semi-conducting. In some embodiments, the electrical properties of the co-wind materials can be chosen to be advantageous for optimizing quench behavior. In other embodiments, more than one stack may be disposed into the groove with separating materials placed between. In this case the dimensions of the groove, which may contain secondary grooves to engage separating materials, are appropriately modified. Co-wind tapes may also include a 'bladder' as described further below. Some factors to consider in selecting the characteristics of the HTS tape include, but are not limited to: operating current of an individual tape, total current desired in tape stack, strain characteristics of the tape as well as other mechanical characteristics. In some applications, it may be desirable to vary the number, size and/or type of HTS tapes in the stack according to location along the pathway, for any of a variety of reasons, such as to save cost, size and/or weight. The current-sharing attributes of stacked non-insulated HTS tapes with optional co-wind allows for this possibility. For example, in regions of low magnetic field strength the number of HTS tapes in the stack may be reduced, taking advantage of the fact that operating currents in the remaining HTS tapes can be increased. Factors that influence the choice of HTS tape width include, but are not limited to, the Lorenz loading on the tape stack and reaction loads on the sidewalls of the grooved channel. Accordingly, the dimensions of the spiral grooves in the plates are selected to accommodate the dimensions of the HTS tape stack, which may vary in location.

In embodiments, the HTS tape stack is fed or otherwise disposed into an end of spiral groove 130 (i.e. so-called in-going spiral groove 130).

In the embodiment shown here, alignment pins 115*a*-N are used to interface with a second plate (e.g., plate 110 of FIG. 1A), maintaining orientation.

Referring briefly to FIG. 1A, a second plate 110 of the stacked-plate double-pancake magnet assembly 100 is disposed over the first plate 105 such that grooves provided 125, in each of the respective plates 105, 110 are aligned.

The mating faces of the two spiral-grooved plates may be partially electrically insulated from each other by application of an insulating coating and/or an insulating plate 140 (also depicted as 440 in FIG. 4) such that plates 105 and 110 electrically connect only over a contact area that includes the point at which the HTS tape stack transitions from one plate to the other, 125.

The second plate 110 has formed or otherwise provided therein grooves 135 which define an in-going channel 136 having a generally spiral shape. As noted above in conjunction with groove 125, it should be appreciated that although groove 135 is here shown having a generally curved spiral shape, other spiral shapes including but not limited to square, rectangular, triangular or oval shapes map also be used. In the embodiment shown here, one end of groove 135 connects to a helical channel, 137, which passes between plates 105 and 110.

When grooves in respective plates are mated together they may form a channel, such as in-going spiral channel 136. The in-going spiral channel 136 receives the HTS tape and co-wind stack (e.g., the HTS tape and co-wind stack 150 of FIG. 1C), which is fed into the helical channel 137. The helical channel 137 is coupled to the helical groove 125 of the first plate 105 such that the HTS tape stack may be fed (or otherwise provided or directed) through helical channel 137 into the helical groove 125 of the first plate 105.

In some embodiments, the material surrounding the helical channel is chosen to have high thermal and electrical conductivity, and may be copper, for example. It should be appreciated that the concept accommodates considerable flexibility in the choice of materials in this region and the specific way in which the geometry of the helical channel is formed and supported mechanically and electrically.

In some embodiments, the HTS tape and co-wind stack is embedded in copper or an otherwise suitable high electrical conductivity material over an extended region that includes the point at which the HTS tape and co-wind stack enter and exit the channels on each of the spiral-grooved plates and extends, uninterrupted, outside the spiral-grooved plates to current feeder connections. This serves to protect the HTS from overheating and damage during magnet charging and magnet quench events.

Figure 1B:
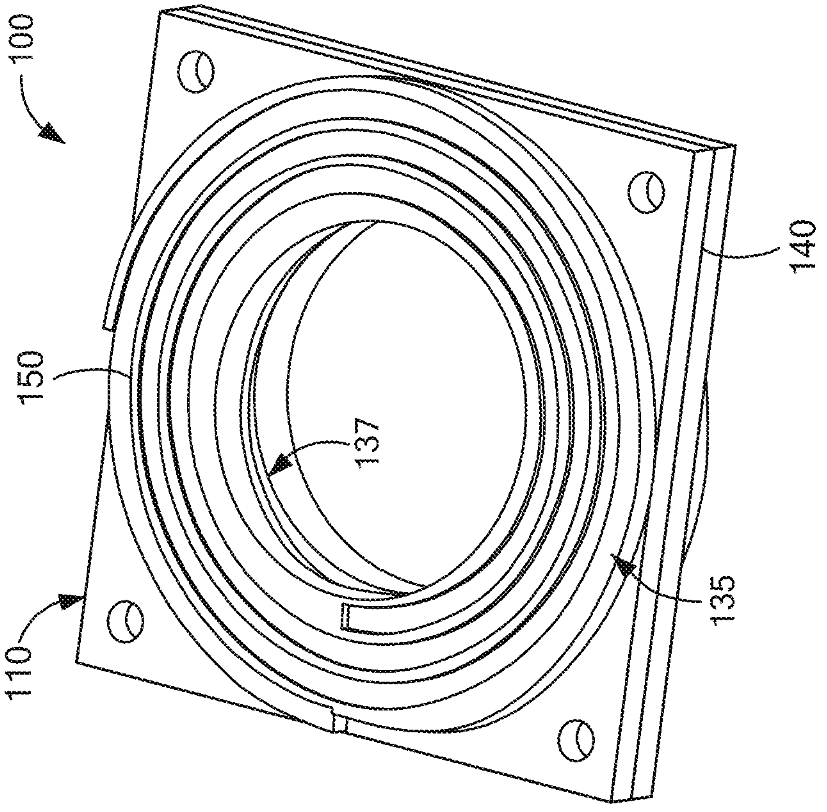
FIG. 1B is an isometric view of a portion of a spiral-grooved, stacked-plate, double-pancake magnet assembly which may be the same as or similar to the spiral-grooved, stacked-plate double-pancake magnet assembly shown in FIG. 1C.

Referring now to FIG. 1B, an HTS tape stack which may include co-wind materials 150 are disposed in the ingoing spiral groove channel 135. A coolant channel 155 or a thermally conducting strip 155 (FIG. 1C) in contract with a separate coolant channel (not shown) is disposed on top of the HTS tape stack. The coolant channel or thermally conducting strip, 155 (FIG. 1C), is configured to allow the magnet assembly 100 to be adequately cooled during all phases of the magnetic operation, including but not limited to magnet charging, in which localized joule heating will occur from bypass currents. In some embodiments, the coolant channel 155 or thermally conducting strip 155 is eliminated.

Referring now to FIG. 1C, the second plate 110 has the HTS tape stack 150 disposed therein. The HTS tape stack 150 is inserted or otherwise disposed into spiral groove channel 135 and helical groove 137 (most clearly visible in FIG. 1B), which channels or otherwise directs the HTS tape stack 150 to the spiral groove channel 135 of the first plate 105.

In embodiments, the first and second plates 105, 110 may include or be formed from superalloys including, but not limited to Inconel 718, Hastelloy C276, as well as a wide variety of structural materials including, but not limited to stainless steels such as 316, and dispersion hardened copper alloys such as GRCop-84. In embodiments, it may be desirable to coat or otherwise dispose a material layer within the channels 130, 135. Such materials may include, but not be limited to electrodeposited solder to aid fabrication, semiconductor coatings, copper plating/coatings and/or ceramic coatings of a variety of thicknesses to control quench current distributions.

In some embodiments, channels 130, 135 and/or the entire plate assembly, 105, 110, can be formed via additive manufacturing technologies such as three-dimensional (3-D) printing. Such technologies have already demonstrated ability to fabricate structures of the sizes and shapes needed using super alloys such as Inconel 718, Inconel 625, as well as a wide variety of structural materials such as 316 stainless steel and the dispersion hardened copper alloy GRCop-84. Suffice it to say that a wide variety of additive manufacturing technologies can be used for fabrication using a wide variety of different materials.

Significantly, in embodiments, the HTS tape stack and co-wind 150 can be un-insulated, partially insulated and/or contain semiconducting materials.

The HTS tape stack may be composed entirely of HTS tapes or may include 'co-wind' tapes, that is, tapes made entirely of non-superconducting materials, interleaved and/or stacked separately on top of a stack of HTS tapes.

Co-wind materials can be conducting, insulating or a semi-conducting with electrical properties chosen to be advantageous for optimizing quench behavior. Co-wind tapes may also include a 'bladder' as described further below. In some embodiments, the HTS tape stack 150 may be formed outside of the channel and then disposed in the channels. In other embodiments, elements of the HTS tape stack 150, including but not limited to the co-wind material, may formed directly into the channels 130, 155, such as via 3D printing techniques.

In some embodiments, the cross-sectional shape of the grooves in the first and second plates are may be substantially identical. In other embodiments, the cross-sectional shapes of the grooves in the first and second plates may be different (e.g. so as to accommodate features, such as structural elements, that may be unique to the plates).

Also, in some embodiments, the first and second plates can also have substantially identical spiral-shaped grooves and can be assembled back-to-back. i.e., with the grooves on opposing surfaces such that when the plates are assembled, the grooves form channels. In other embodiments, the spiral shape in each plate may differ.

In embodiments, the channel forms an in-going spiral on the top plate, a helix down to the bottom plate, and an out-going spiral on the bottom plate. The HTS tape stack and co-wind can be inserted into the channel. The co-wind materials and surface coatings can be selected to safely distribute magnet quench energy within the volume of the structure.

Figure 2:
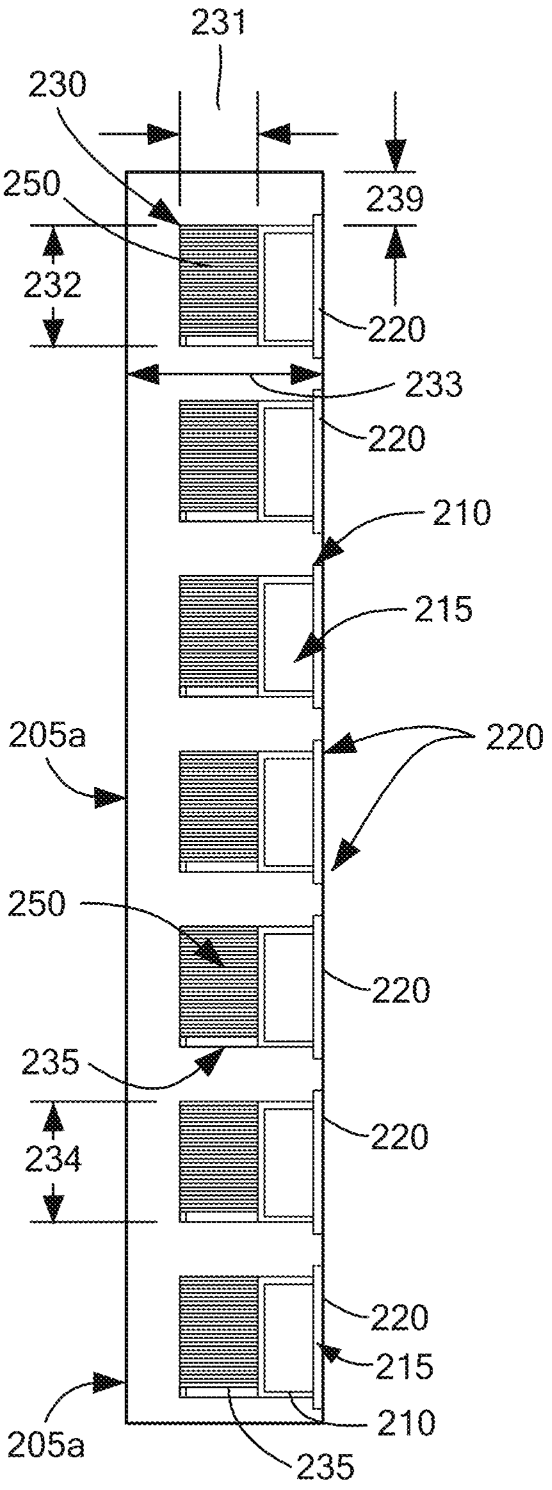
FIGS. 2-2A are a series of cross-sectional views of a spiral-grooved plate showing options for coolant channels running along the HTS tape.
Figure 2A:
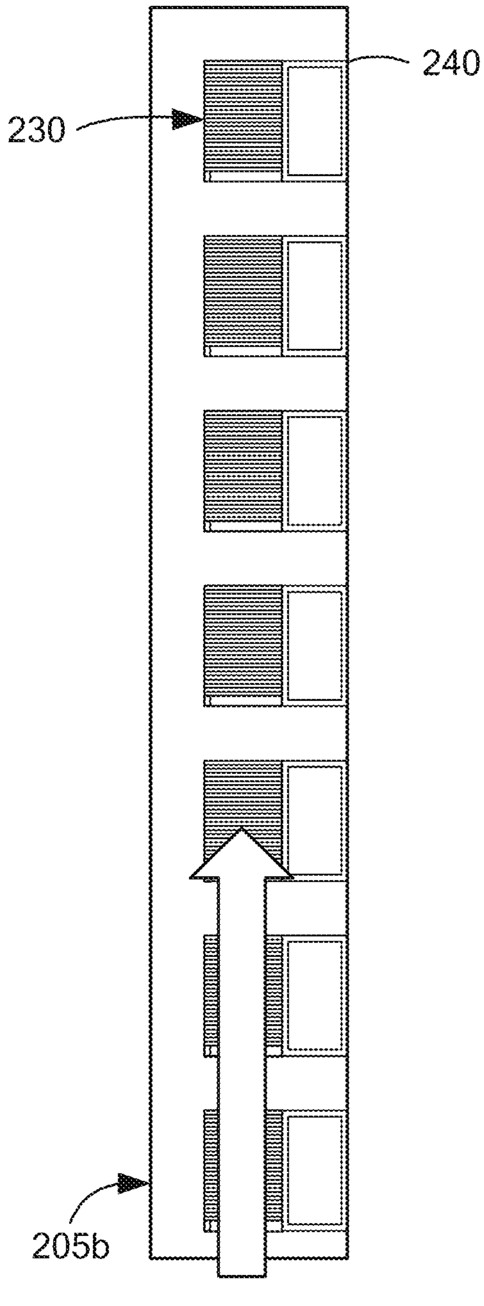
Figure 3:
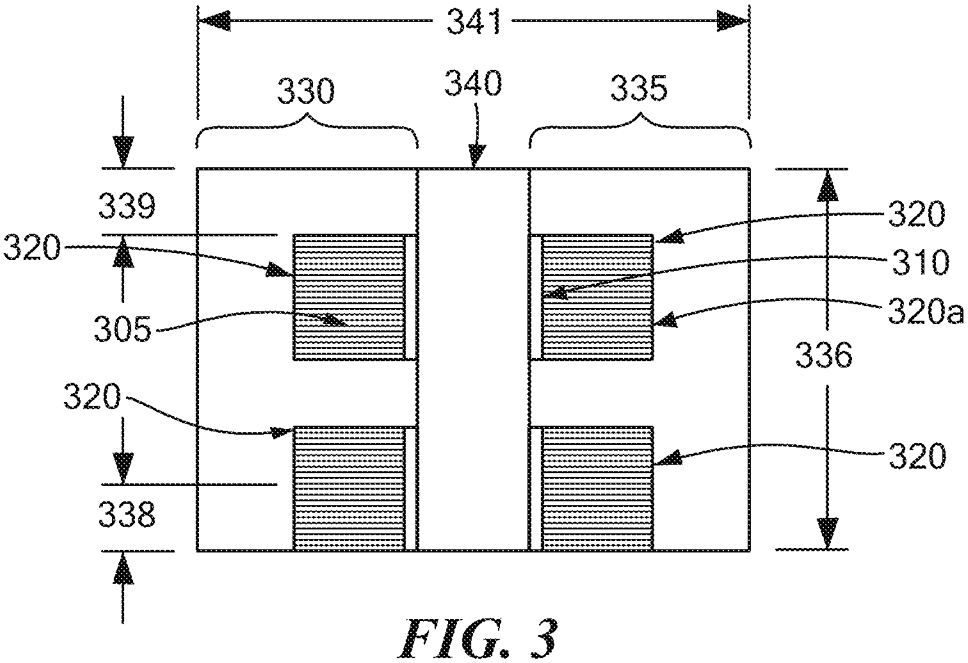
FIG. 3 is a cross-sectional view of two plates having spiral-grooves provided therein with the plates stacked against a shared coolant channel plate or a conduction-cooled plate.

In some applications (for example a toroidal field coil for the proposed SPARC experiment), it may be necessary to remove heat generated from volumetric sources in the region of the tape stack (e.g., neutron-induced heating, copper junctions) to maintain operating temperature. The spiral-grooved, stacked-plate approach can readily accommodate this in a number of ways. FIGS. 2 and 2A illustrate two different embodiments with coolant channels disposed along a tape stack. In general, coolant channels are located aside (e.g. proximate, adjacent, or contiguous with) the primary load path (e.g., the superconductor). The copper-coated HTS tape plane may be oriented perpendicular to the coolant channel, which maximizes heat transfer. FIG. 3 illustrates an alternate approach of employing a coolant channel plate in the stack that is shared between opposing pancakes.

FIGS. 2 and 2A show cross-sections of plates in which the groove is recessed into the plate. This is in contrast to the plates of FIGS. 1-1C in which the walls of the groove are above the main surface of the plate. Referring now to FIG. 2, a spiral-grooved plate 205*a* includes grooves or channels 230. In this illustrative embodiment, the channels 230 are provided having a rectangular cross-sectional shape. In other embodiments, channels 230 may be provided having other cross-sectional shapes (i.e. other than rectangular) including but not limited to square, triangular, oval or round or other regular geometric shapes. The cross-sectional shape of the channel may be selected to be complementary to the shape of the HTS tape or vice-versa. Ideally, but optionally, the HTS tape (or a combination of the HTS tape and co-wind and/or a shim and/or a bladder device) substantially occupies the cross-section of the channel. In general, it is desirable, but optional, for the channel 230 to be filled, as much as possible (e.g. to the extent to which material characteristics and/or mechanical and/or manufacturing tolerances and/or manufacturing techniques will allow), with material having a high mechanical strength, high thermal heat capacity high thermal conductivity and with electrical properties that optimized magnet quench response.

In this illustrative embodiment, plate 205*a* has width 233 of about 15 mm. The channels 230 have a depth of about 11 mm into the plate 205*a*. The channels also have a length 234 of about 9 mm. Inserted or otherwise disposed within the channels 230 is an HTS tape stack 250 having a width 231 of about 6 mm and a length 232 of about 8.33 mm. A shim 235, here having a wedge shape, is inserted or otherwise arranged into the groove 230 such that the HTS tape stack 250 is pressed against a sidewall of the groove. In this illustrative embodiment, one of the channels is formed or otherwise provided a distance 239 of about 4.25 mm from a surface of plate 205*a*. However, these dimensions are merely by way of illustration, as the structures described herein may have any of a variety of suitable dimensions.

In embodiments, the magnet assembly can further comprise one or more coolant channels. In embodiments, the one or more coolant channels may be provided in one or both of the first and second plates. In embodiments, the one or more coolant channels can comprise one or more coolant pathways disposed proximate the HTS tape stack. In other embodiments, the one or more coolant channels can comprise one or more cooling channel plates interleaved or otherwise dispersed between a plurality of plates which make up the high-field magnet assembly.

A coolant channel 215 is provided proximate the HTS tape stack 250. In this illustrative embodiment, the coolant channel 215 is positioned on top of the HTS tape stack 250 and is formed or otherwise defined by a thermally conductive member 210 having a C-shape (e.g., a C-shaped channel member 210). In this illustrative embodiment, the coolant channel is provided having an area of about 30 $mm^2$. However, this is merely by way of illustration, as any suitable coolant channel area may be used. The thermally conductive member 210 may comprise one or more of: copper, copper alloy, and a high thermal conductivity material. The coolant channel 215 is covered or otherwise closed (or capped) using a cap 220 that is secured (e.g. welded or otherwise secured) onto the plate 205*a*. The cap 220 is configured to seal the HTS tape stack 250 and the coolant channel 215 within the grooves 230. In an embodiment, a tape stack having a length of about 8 mm may be provided from about 190 HTS tapes, each 6 mm wide. In embodiments, a superalloy (e.g. Hastelloy) may be used as a co-wind material to achieve the 8 mm length with a reduced number of HTS tapes.

In embodiments, a plurality of spiral grooved plates may be used and a method for constructing a high-field magnet comprises assembling a series of HTS-loaded spiral-grooved plates, stacked between coolant channel plates includes forming one or more inter-pancake electrical connections, each of the one or more inter-pancake connections having a low electrical resistance characteristic, such that the resultant joule heating can be accommodated by the coolant scheme. In embodiments, forming one or more inter-pancake connections can comprise forming one or more other inter-pancake connections automatically.

FIG. 2A is a cross-sectional view of a spiral-grooved plate 205*b*. The spiral grooved plate 205*b* may be substantially similar to the plate 205*a*. In this embodiment, a welding cap is not used to seal the HTS tape stack 250 and the coolant channel 215. The coolant channel 215 is encapsulated by a rectangular coolant tube 240. The rectangular coolant tube can comprise one or more of: copper, copper alloy, or any other material having a thermal conductivity characteristic similar to or greater than the aforementioned materials.

In the examples illustrated by FIGS. 2-2A, the HTS tape stack 250 is oriented perpendicular to the coolant channel 215. This orientation may be selected to increase (and ideally, maximize) heat transfer. A skilled artisan understands that other orientations can be used.

Figure 3A:
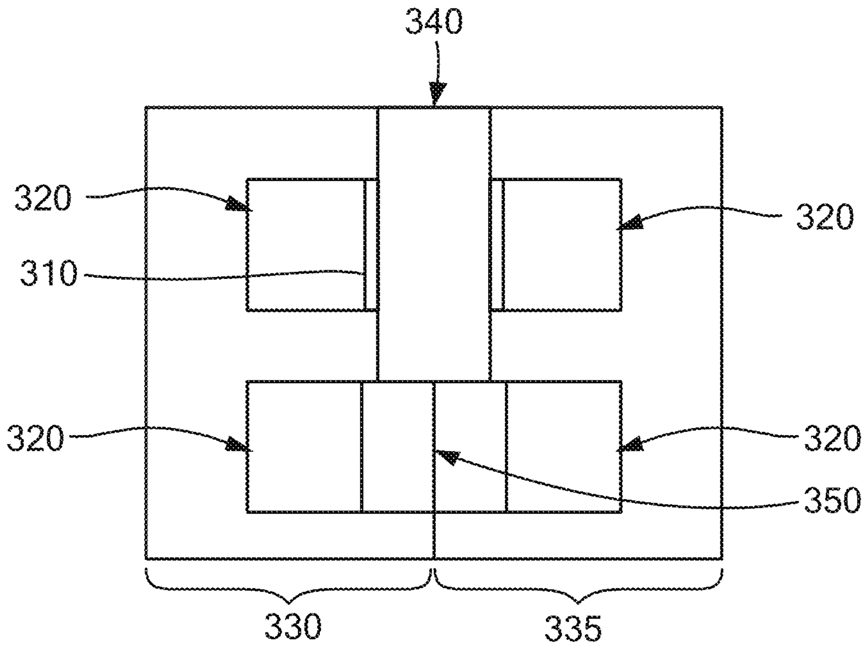
FIG. 3A is a cross-sectional view of two plates having spiral-grooves provided therein with the plates stacked against a shared coolant channel plate or a conduction-cooled plate and having a copper interconnect between pancakes made in a region thereof.

As noted above, FIGS. 3 and 3A illustrates an alternate approach of employing a shared coolant channel 340 between opposing pancakes 330, 335. In embodiments, this may be achieved via a coolant channel plate in the stack that is shared between opposing pancakes 330, 335. In some embodiments, grooves are cut into the surfaces of opposing pancakes 330 and 335 to form coolant channels (FIG. 3A). FIGS. 3 and 3A are cross-sectional views of two spiral-grooved plates showing the option of stacking them against a shared coolant channel (e.g. via a shared coolant channel plate or conduction-cooled plate or by cutting matching grooves in surface of the spiral-grooved plates and copper caps that cover the HTS stack and co-wind). If desired, a copper interconnect between pancakes may be made in this region. It should be noted that like elements of FIGS. 3 and 3A are provided having like reference designations.

This 'coolant channel plate' concept provides significant flexibility for improvement of (and ideally, optimization of) coolant pathways. This may be a useful feature in some applications such as the SPARC toroidal field coil. Alternatively, a conduction-cooled plate can be used in place of the coolant channel plate or eliminated altogether, accommodating designs and applications that have low levels of internal volumetric heating.

In order to control quench dynamics and to help mitigate temperature rise of HTS tapes during a quench, conducting plates (e.g. copper) may be inserted between the double pancakes; one observation is that quench-induced eddy currents would be preferentially excited in these structures, localizing the magnetic stored energy deposition to regions that are thermally and electrically disconnected from the HTS tapes. Such structures are naturally accommodated by the spiral-grooved, stacked-plate design concept; they may be incorporated directly into the coolant channel plate design, which is electrically isolated from the pancakes and in good thermal contact with the coolant.

In order to control quench dynamics and to help mitigate temperature rise of HTS tapes during a quench, high electrical conductivity coatings (e.g. copper) and/or insulating coatings (e.g. alumina) may be applied to selected areas of the spiral-grooved plates, including but not limited to, the grooved side of the plate and the non-grooved side of the plate; one observation is that the quench-induced current density, distribution and resultant joule heating can be controlled by tailoring the resistance of key electrical pathways in the magnet structure.

This stacked-plate geometry also naturally accommodates copper interconnections between pancakes, if desired, as shown in FIG. 3A. At the same time the grooved plate/coolant channel plate assembly can be designed, through suitable selection of materials, to maintain a relatively high-resistance electrical connection between adjacent pancake windings, which may be employed to reduce magnet charging time in this non-insulated superconducting magnet design.

It may be advantageous to preload the tape stack in the groove prior to soldering or to employ a preloading mechanism that eliminates the need for soldering altogether. FIGS. 2 and 5 illustrate the use of a 'wedge shim' to accommodate this, however the use of a hydraulic bladder is also possible (FIG. 4) and is in many ways preferred.

FIG. 3 is a cross-sectional view of two plates 330, 335 that have spiral-grooves 320 provided therein. The plates 330, 335 have a shared coolant assembly 340 between them which, as noted above, can be a coolant channel (e.g. as may be provided in a coolant channel plate, and/or facilitated by cutting grooves in the top surfaces of the spiral grooved plates and copper that covers the HTS stack and co-wind) or a conduction-cooled plate. The double pancake structure provided from spiral grooved plates 330, 335 and coolant assembly 340 may have a width 341 of about 20 mm, although this is merely by way of illustration. In the illustrative embodiment of FIG. 3, the spiral-grooves 320 include an HTS tape stack with optional co-wind materials 305 and a cap plate 310 that can be comprised of copper, or other thermally conductive materials. In other embodiments, the cap plate 310 may be eliminated, exposing the HTS stack and co-wind to the coolant directly or to the conduction plate directly. In this illustrative embodiment, the plates have a length 336 of about 14 mm and the tape and channels 320 are provided having a width 337 of about 4 mm, a length 338 of about 4.5 mm and one of the channels (here, illustrated as channel 320*a*) is formed or otherwise provided a distance 339 of about 2.5 mm from a surface of plate 335. However, these dimensions are merely by way of illustration, as the structures described herein may have any of a variety of suitable dimensions.

In an embodiment in which the coolant assembly 340 is a coolant channel between plates 330, 335, the coolant path established by the channel is not constrained to flow along the HTS stack and can therefore be optimized for heat removal. For example, short radial pathways across the HTS stacks can be used, spreading heat more effectively across turns. This can be useful for applications in which high levels of internal volumetric heating of the magnet windings may occur (e.g. toroidal field magnet for SPARC). In addition, multiple coolant loops can be employed, reducing coolant velocity and drive pressure requirements. Finally, coolant passageways can have variable size and may be implemented only where they are needed, setting aside more volume in the winding pack for structural elements. In embodiments that have lower levels of internal volumetric heating, a conduction-cooling approach may be adequate. In this case, the coolant channel plate can be replaced with a conduction-cooled plate or even eliminated.

To control quench dynamics and to help mitigate temperature rise of the HTS tape stack 305 during a quench, conducting plates (e.g. copper) may be inserted between the plates 330, 335 in the coolant channel region 340. Accordingly, quench-induced eddy currents would be preferentially excited in the conducting plates, localizing magnetic stored energy dissipation to regions that are thermally and electrically disconnected from the HTS tape 305.

FIG. 3A is a cross-sectional view of two plates 330, 335 that have grooves 320 provided therein. The plates 330, 335 are stacked against a shared coolant assembly 340 which can be a coolant channel plate, grooves in the top surfaces of the plates, or a conduction-cooled plate. An interconnect 350 is disposed in a region between the plates 330, 335. This interconnect serves to bridge the electrical current path between the inner most turns of adjacent plates in the magnetic assembly (refer to 621 in FIG. 6, 621*a* in FIGS. 6A and 720*b* in FIG. 6C). In an illustrative embodiment, the interconnect 350 can comprise copper (e.g. a high thermal and electrical conductivity copper) soldered to the HTS stacks with an interface layer (e.g. using an indium or indium alloy interface layer) to bridge the connection. A suitable low melt temperature soldered connection may also be used. The interconnect 350 combined with the overall electrical connection between plates 330, 335 is configured to accommodate bypass currents that flow during magnetic charging while also increasing (and ideally maximizing) the electrical resistance between the plates 330, 335, which reduces (and ideally minimizes) magnet-charging time.

Figure 4:
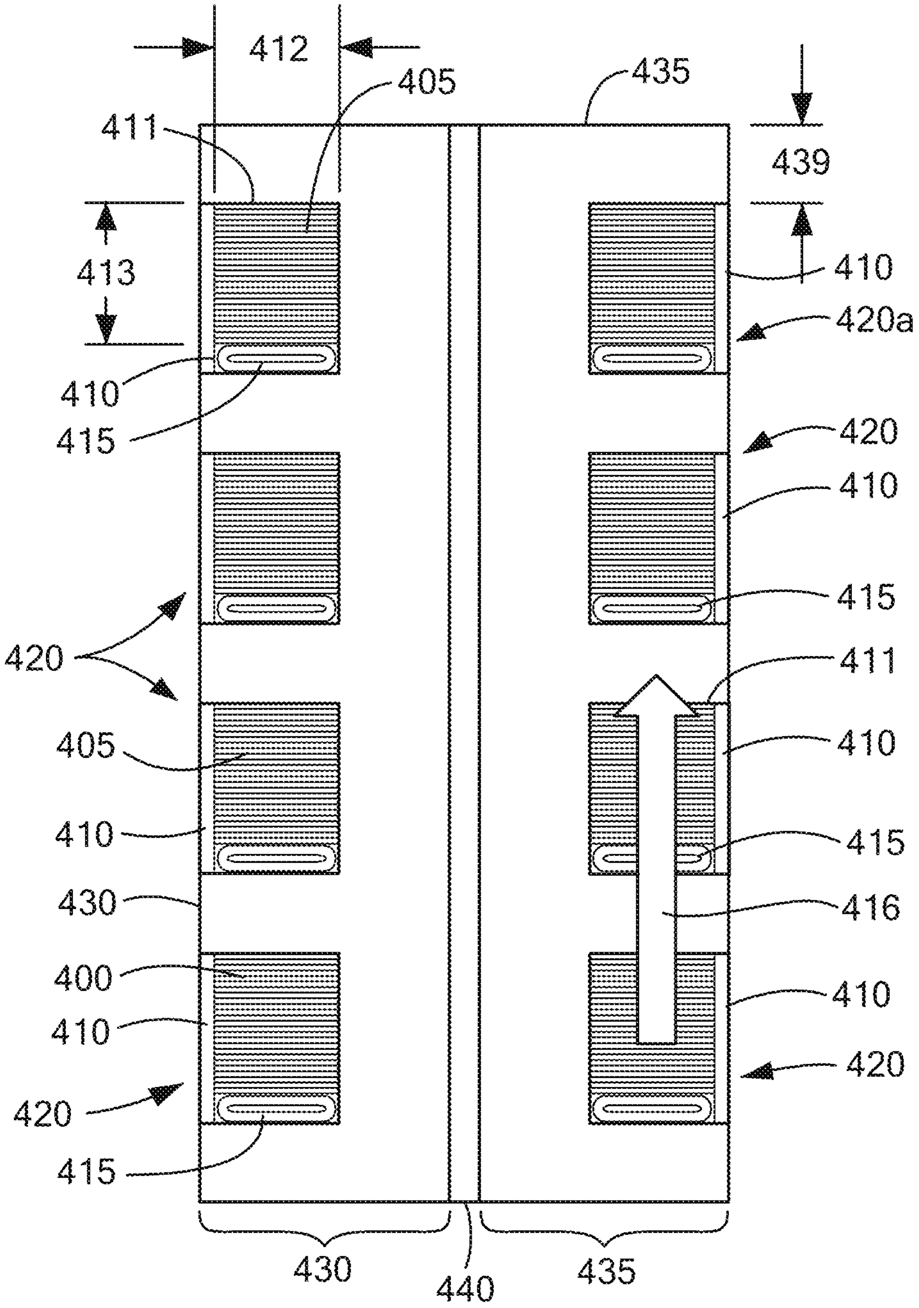
FIG. 4. is a cross-sectional view of a magnet having a hydraulic bladder.

FIG. 4. is a cross-sectional view of a magnet 400 comprising a first plate 430 and a second plate 435. An insulator 440 is disposed between the plates 430, 445. In this embodiment, the insulator 440 inhibits (and ideally prevents) bypass currents that arise from magnet charging from flowing directly across plates 430 and 435. Instead, such currents are forced to flow along the plates and propagate (or jump) across the plates only in the vicinity of a plate-to-plate interconnect (e.g. interconnection 350 in FIG. 3A) in that embodiment or in the vicinity of a helical HTS tape stack interconnect (e.g. groove 125 in FIG. 1) in that embodiment. The insulator may be comprised of, but is not limited to, fiberglass composite, mineral insulation (e.g. mica), alumina or insulating coatings such as alumina.

Spiral grooves 420 are provided in the plates 430, 435. An HTS tape stack which may include co-wind materials 405 is inserted into the grooves 420 and a cap assembly 410 (which may be provided, for example, as a copper cap assembly) is disposed on top of the HTS tape stack and co-wind 405.

A bladder element 415 (or more simply bladder 415) is disposed in the groove (or channel) to compresses the stack 405 against a sidewall 411 of the groove 420. In embodiments, the bladder 415 can be a hydraulic bladder in which hydraulic fluid can be applied to provide the compression. In some embodiments, the bladder 415 is positioned such that the tape stack 405 is compressed against the primary load-bearing sidewall. In this example, tape stack is provided having a width 412 of about 4 mm a length 413 of about 4.5 mm and the direction of primary load (i.e. the primary Lorentz force (IxB) load) in FIG. 4 is designated by reference numeral 416 which results in sidewall 411 corresponding to the primary load-bearing sidewall. The bladder 415 compresses the HTS tape stack 405 such that the impact of Lorentz force (IxB) loads being cyclically applied and released can be reduced (and ideally, minimized). In this illustrative embodiment, one of the channels (here, channel 420*a*) is formed or otherwise provided a distance 439 of about 2.5 mm from a surface of plate 435. However, these dimensions are merely by way of illustration, as the structures described herein may have any of a variety of suitable dimensions.

In embodiments, a bladder element can be included as a co-wind element in the HTS tape stack (i.e. as part of the HTS tape stack). The bladder element can be configured in the HTS tape stack to preload the HTS tape stack prior to soldering so as to facilitate the soldering process by securing the HTS tape stack in a desired position. In embodiments, the bladder element can also be configured in the HTS tape stack to eliminate the need for soldering. The bladder element can also be configured to pre-compress the HTS tape stack against a load-bearing sidewall of the at least one spiral groove.

In some examples, after the HTS tape stack 405 is soldered, the hydraulic fluid can be removed and can further be replaced with an inert gas. In cases in which the bladder 415 is empty, the bladder acts as a spring to accommodate differential thermal shrinkage of the soldered HTS stack 405 relative to the grooved plates 430, 435 during magnet cool-down and warm-up periods to reduce a risk of HTS stack and co-wind delamination damage.

In other examples, if hydraulic fluid is retained, a compressive force on the HTS tape stack 405 may be maintained such that it is fully immobilized. The hydraulic fluid can be selected such that it will freeze at a magnet operating temperature, eliminating a need to actively maintain hydraulic pressure.

In some cases, the bladder element can contain (e.g. be filled with or otherwise have disposed therein) a material that is liquid during assembly but is solid at magnet operating temperatures. One such material includes, but is not limited to, gallium. The heat of fusion associated with this material can act a large thermal reservoir to limit the temperature rise of the tape stack 405 during a quench event, i.e., limit an HTS stack temperature to be no greater than a melt temperature of 29.8 degrees C. in the case of gallium.

In all of these embodiments, a choice of materials, coatings, conductors, semiconductors, and insulators in the assembly can be used to improve (and ideally, optimize) current sharing and eddy current pathways in response to a magnet quench event, safely distributing the magnet quench energy over a large volume.

Figure 5A:
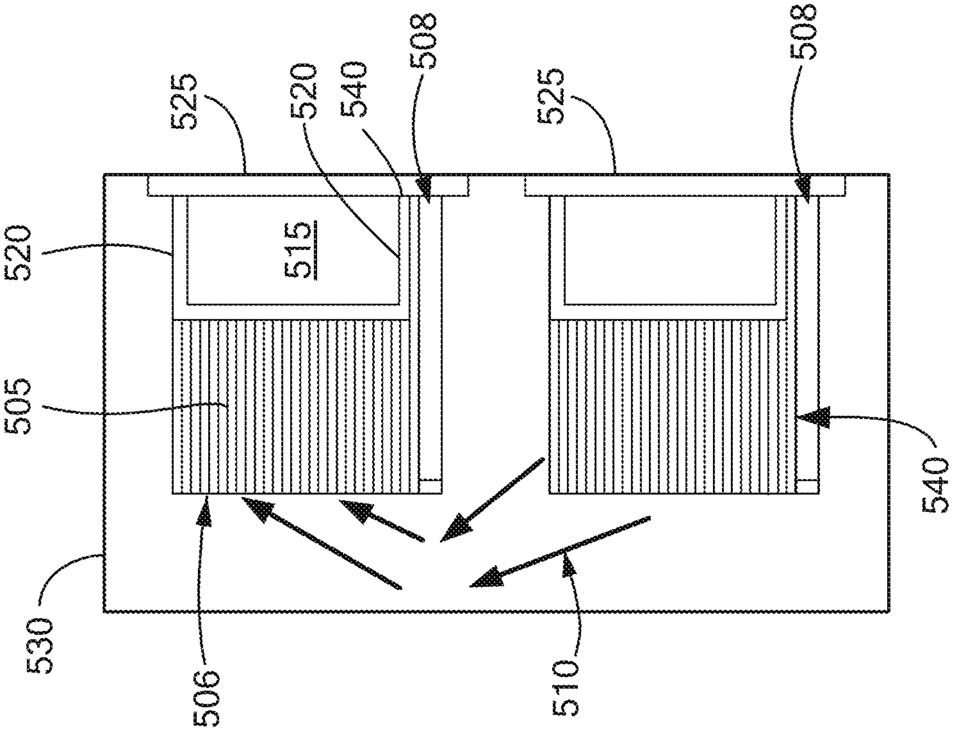
FIGS. 5-5A are a series of cross-sectional views of a magnet illustrating a choice of materials, coatings and insulators in a co-wound tape stack and spiral groove which can be used to control heat deposition zone of magnet quench.
Figure 5:
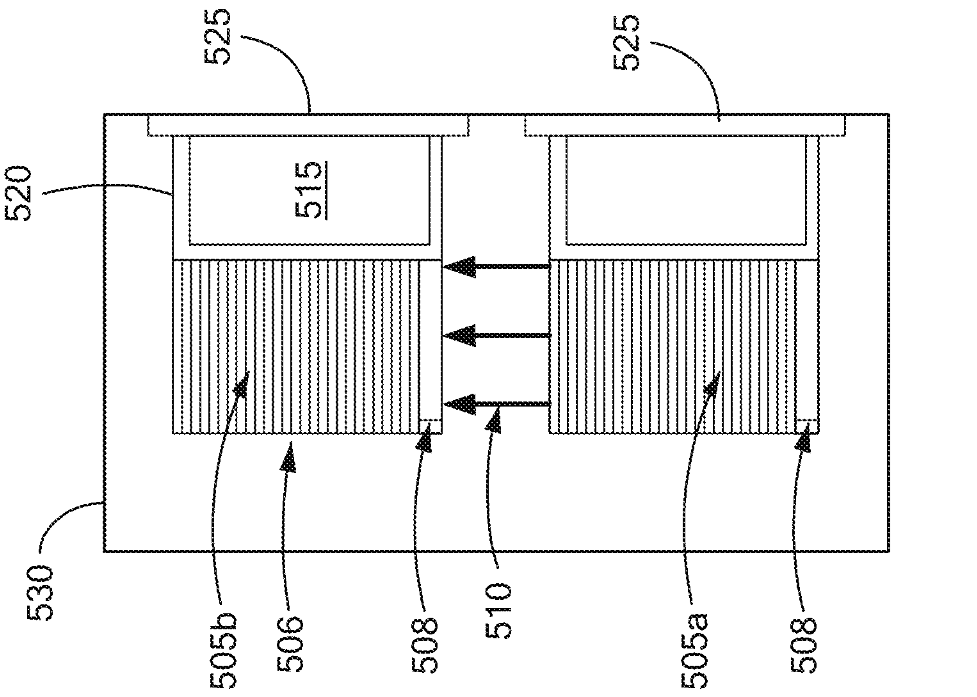

Referring now to FIGS. 5-5A in which like elements are provided having like reference designations, shown are cross-sectional views of a magnet illustrating an example of how the choice of materials, coatings, conductors, semiconductors, and insulators in a co-wound tape stack and spiral grooved plate can be used to control the zone of magnet quench energy heat deposition quench according to embodiments described herein. The arrows designated by reference numerals 510 in FIGS. 5-5A, represent the flow of current-sharing currents driven by a quench event. In this example, the currents are driven from a first (or lower) HTS tape stack 505*a* to a second HTS stack 505*b* (here, its nearest neighbor 505*b*). Taking the configuration of tape stack 505*b* as illustrative of tape stack 505*a*, tape stack 505*b* is disposed in a groove 506 provided in a plate 530. A wedge shim 508 (or alternatively a bladder) is disposed in the groove 506 adjacent tape stack 505*b*. A coolant channel 515, defined by a C-shaped member 520, is disposed in thermal contact with tape stack 505*b*. A cap 525 is disposed over the coolant channel. Wedge shim 508, coolant channel 515, C-shaped member 520, and cap 525 may be the same as or similar to (in both structure and function) the wedge shims (or bladders), coolant channels, C-shaped members, and caps described herein above in conjunction with FIGS. 2-4.

The rate of volumetric heat generation in the spiral grooved plate due to quench currents can be quantified as $\eta j^2$, where j is the current-sharing current density and $\eta$ is the electrical resistivity of the material in which it flows. In FIG. 5A an insulator 540 is inserted as a co-wind material at the base of the HTS stack while in FIG. 5, no such insulator is present. Because an insulator is present in FIG. 5A, the quench currents flow deeper into the backbone of grooved plate 530 and over longer distances compared to the embodiment in FIG. 5. Thus the volume in which the quench energy is dissipated is larger in FIG. 5A compared to FIG. 5. Alternatively, or in addition, the non-grooved side of the spiral-grooved plate may be coated with a high electrical conductivity material (e.g. copper) to promote current-sharing currents to flow deep into the backbone of the spiral-grooved plate, thereby increasing the volume of material in which the quench energy is dissipated.

Figure 6:
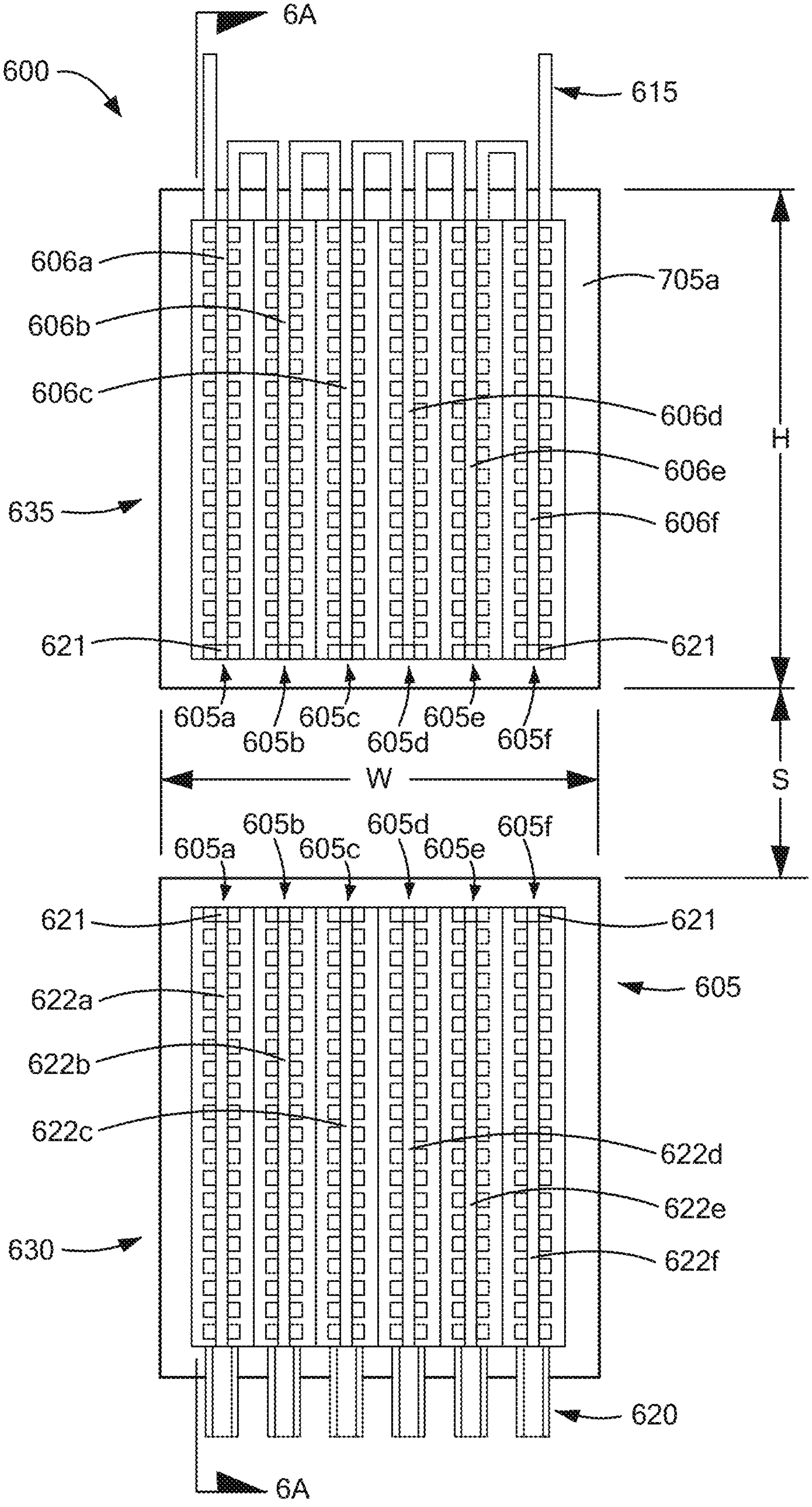
FIG. 6 is a cross-sectional view of a spiral grooved magnet plate assembly taken in the direction across lines 6-6 of the spiral grooved plate shown in FIG. 6A.
Figure 6A:
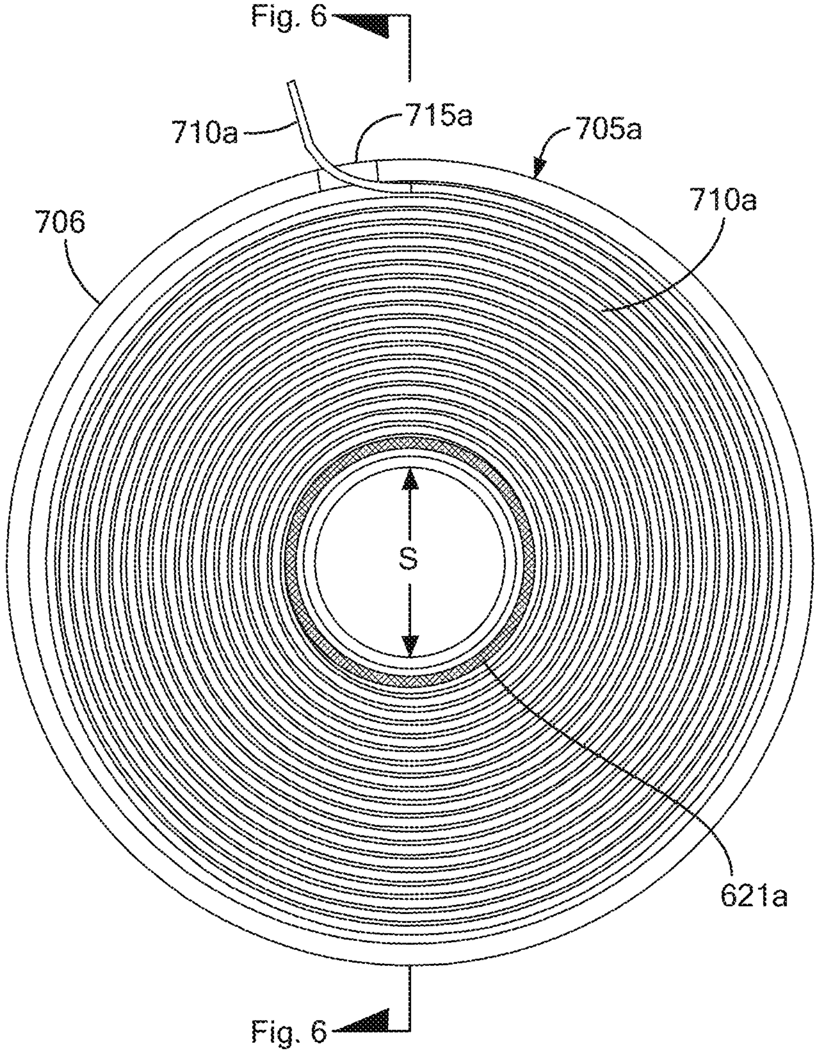
FIG. 6A is a top view of a first spiral grooved plate.
Figure 6C:
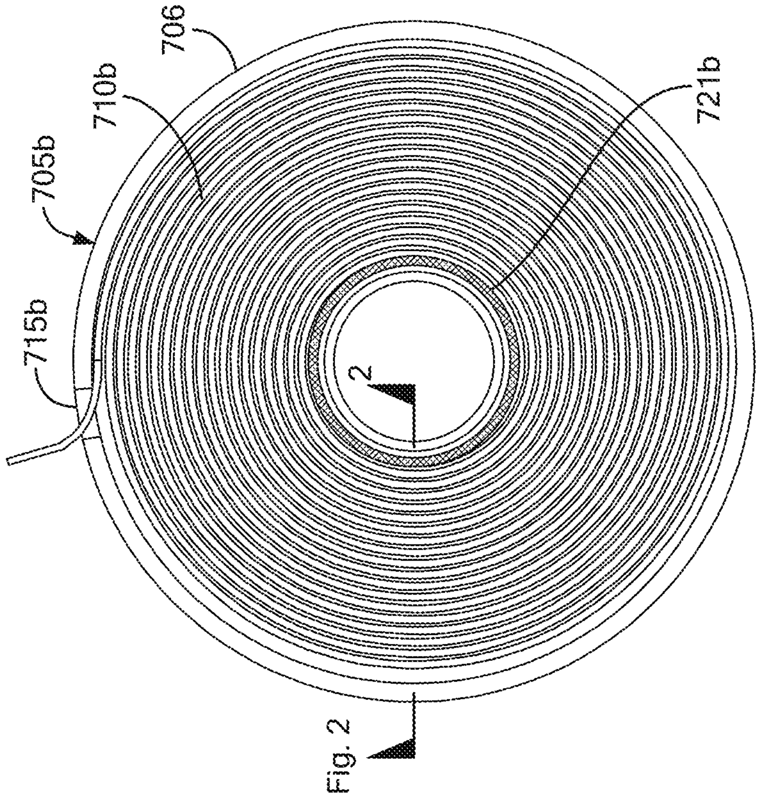
FIG. 6C is a top view of a second spiral grooved plate.

In overview, FIGS. 6-6C illustrate how alternating stacks of spiral-grooved, HTS-loaded plates and coolant channel plates (possibly augmented by coolant channel grooves cut into the surface of the spiral-groove plates) might be assembled to form a high-field magnet. It should be appreciated that in these illustrations, the interconnect option between pancakes (e.g. such as the copper interconnect described in FIG. 3), is shown. It should, however, be understood that the helical tape interconnect option, as described above in conjunction with FIG. 1, can also be employed and in some applications (e.g. compact fusion applications) is preferred. In an embodiment, a magnet with a radial build of H=160 mm, width W=140 mm and clear bore diameter S=100 mm is projected to produce ~20 tesla on axis using existing, commercially available HTS tapes. The spiral-grooved plates can be fabricated by additive manufacturing techniques (e.g., 3D printing) in a super alloy such as Inconel 625 using commercially available methods. Stresses within the support plates are projected to be well within the allowable limits for 3D printed parts made of Inconel 625.

FIG. 6 is a cross-sectional view of a high-field coil 600 comprising a stack of six spiral-grooved double pancakes 605*a*-605*f*, generally denoted 605, each with a coolant channel plate 606*a*-606*f* inserted or otherwise disposed therebetween. As noted above, in an embodiment, the high-field coil 600 is projected to attain ~20 tesla on axis using existing, commercially available HTS tapes according to embodiments described herein.

In this embodiment, current flows into and out of each double pancake 605 at the top of FIG. 6 via external feeders 615. The current winds around the spiral groove of each plate, passing alternatingly through the cross-sectional views of 635 and 630. In this case, an internal interconnection (generally denoted 621) is used to connect the electrical pathway across the innermost turns the spiral windings, similar to internal connection 350 described above in conjunction with FIG. 3A. Thus, the connected pairs of spiral grooved plates effectively form the six double pancake sub-assemblies 605*a*-605*f*.

In this embodiment, feeders, generally denoted 620, are configured to send and receive coolant into the coolant channel plates 622*a*-622*f* that are located in the middle of the double pancake assemblies.

FIG. 6A is a top view of a first spiral grooved plate 705*a* of the illustrative magnet assembly 600 whose cross-sectional view is shown in FIG. 6. Plate 705*a* may be provided from any electrically conductive material 706 including metals or alloys. Such materials include, but are not limited to, one or more of nickel-based super alloys such as Inconel 718 and Hastelloy C276, austenitic stainless steels, and dispersion hardened copper alloys. Factors that influence material selection include, but are not limited to: mechanical strength, electrical conductivity, thermal conductivity, and coefficients of thermal expansion. In embodiments, plate materials 706 may comprise a composite of different materials. Materials may be selected to optimize uniformity of quench energy deposition, structural integrity under load and under off-normal conditions and to minimize cost. As noted above, additive manufacturing techniques can be readily employed to fabricate the plate geometries employed, from which a magnet can be constructed.

The first plate 705*a* includes an access 715*a* that is configured to receive an HTS tape stack 710*a*. The HTS tape stack 710*a* is fed into groove channels (e.g., grooves or channels 130 of FIG. 1) of the first plate 705*a*. In this embodiment the first plate 705*a* includes electrical interconnect 621*a* at the inner most turn, similar to 350 illustrated in FIG. 3A. In this case, the electrical interconnect component takes the shape of a circular ring. The first plate 705*a* is stacked on a second plate (e.g., the second plate 705*b* of FIG. 6C) and a cooling plate 730 (e.g., an insulating radial coolant channel plate) shown in FIG. 6B) is inserted between the two spiral grooved plates 705*a*, 705*b*. Thus, in this illustrative embodiment, spiral grooved plates 705*a*, 705*b* and cooling plate 730 form the double pancake structure.

In some embodiments, the HTS tape and co-wind stack is embedded in copper or an otherwise suitable high electrical conductivity material over an extended region that includes the point at which the HTS tape and co-wind stack enter 715*a* and exit 715*b* the channels on each of the spiral-grooved plates and extends, uninterrupted, outside the spiral-grooved plates to current feeder connections. This serves to protect the HTS from overheating and damage during magnet charging and magnet quench events.

In some embodiments, more than one HTS tape stack may be disposed in the grooved channel with separate structures and/or co-wind materials disposed between tape stacks; the dimensions of the channel groove are appropriately modified to accommodate these materials and/or to engage them mechanically, such as via secondary spiral grooves. In some embodiments, some or all of the co-wind materials may be disposed to engage with the plate mechanically, such as via spiral grooves.

It should be noted that an internal electrical interconnect, perhaps taking the shape of a circular ring in this example case, could also be used on the outermost turns to connect between double-pancake assemblies.

It should be noted that if the double pancake embodiment of FIGS. 1-1C were used, there would be no need to employ the internal interconnections at the inner most turns shown here. Instead, the HTS tape stack and co-wind would continuously connect from spiral grooved plate 705*a* to plate 705*c*. In this case, the coolant channel plates would be located aside each double pancake assembly rather between the two plates that form double pancake assemblies, as depicted here.

Figure 6B:
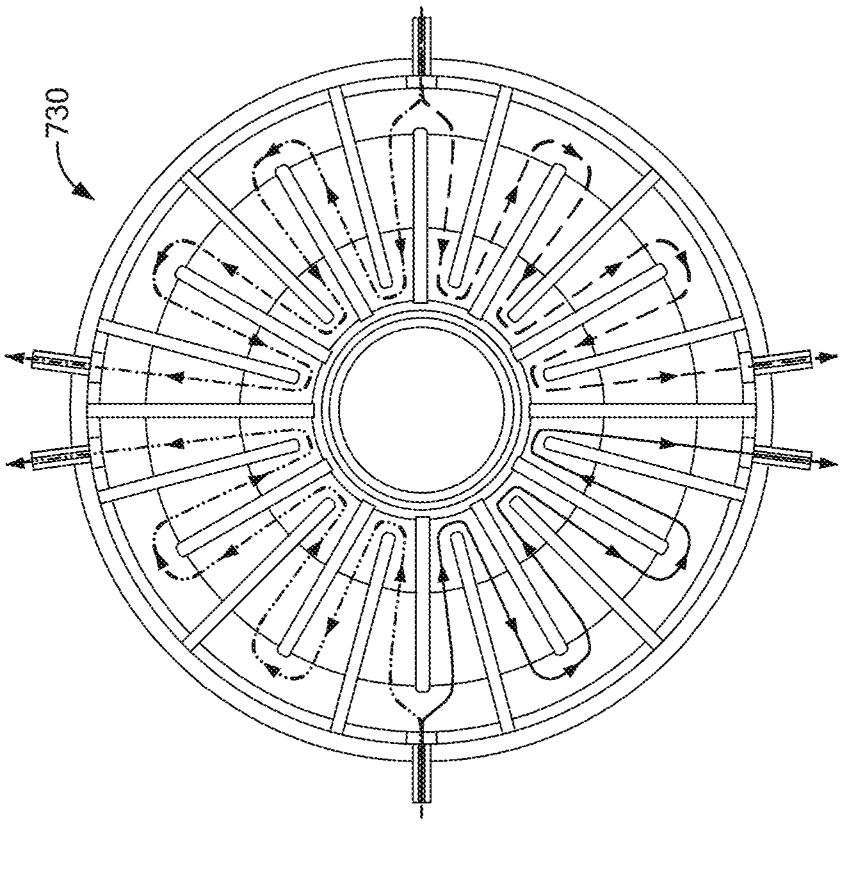
FIG. 6B is a top view of a channel plate having insulating radial coolant channels provided therein.

FIG. 6B is a top view of a cooling channel plate 730 having insulating radial coolant channels 735 provided therein. The cooling channel plate 730 is configured to receive cooling fluid via coolant access assemblies 745*a*-N. In this embodiment, four separate flow paths of coolant into and out of the cooling channel plate are depicted with arrows. The cooling channel plate is constructed so that it is electrically insulated from spiral groove plates 705*a* and 705*b* when placed in the assembly. This feature blocks bypass currents, which arise from magnet charging, from flowing between plates 705*a* and 705*b* through the coolant channel plate. This function can be attained by: making the plate from an electrically non-conducting material, such as but not limited to a fiberglass composite; applying an insulating coating to an otherwise electrically conducting base material; or by some other suitable means. In some embodiments, the coolant channel plate forms only the sidewalls of the coolant channels; the adjacent HTS stacks and spiral grooved plates form the remaining walls. In this case, the coolant is in direct contact with the HTS stack and co-wind. In other embodiments, grooves may be cut into the surfaces of the adjacent spiral-grooved plates and copper cap material to serve as coolant channels. The grooves can run along or across the HTS stack as needed to facilitate cooling and optimize coolant passageway lengths and minimize pressure drop.

It should be understood that coolant pathways shown in FIG. 6B is just for illustration. These pathways can be tailored according to the needs and constraints in the magnet design such as considerations of heat removal and structural integrity of the magnet assembly. The coolant channel plate may be replaced by a conduction-cooled plate or may be eliminated altogether, replaced by a simple insulating material. In the latter case, coolant channel passageways may be formed by cutting grooves into the surface of the spiral-grooved plates and copper cap material.

FIG. 6C is a top view of a second spiral grooved plate 705*b*. The second plate 705*b* includes an access 715*b* that is configured to receive an HTS tape stack 710*b*. The HTS tape stack 710*b* is fed into groove channels (e.g., groove channels 135 of FIG. 1A) of the second plate 705*b*. The HTS tape stack 710*a* is fed into groove channels (e.g., groove channels 135 of FIG. 1A) of the second plate 705*b*. In this embodiment the second plate 705*b* includes an electrical interconnect 720*b* that matches and mates to the electrical interconnect 720*a* of the first plate 715*a*.

Figure 7:
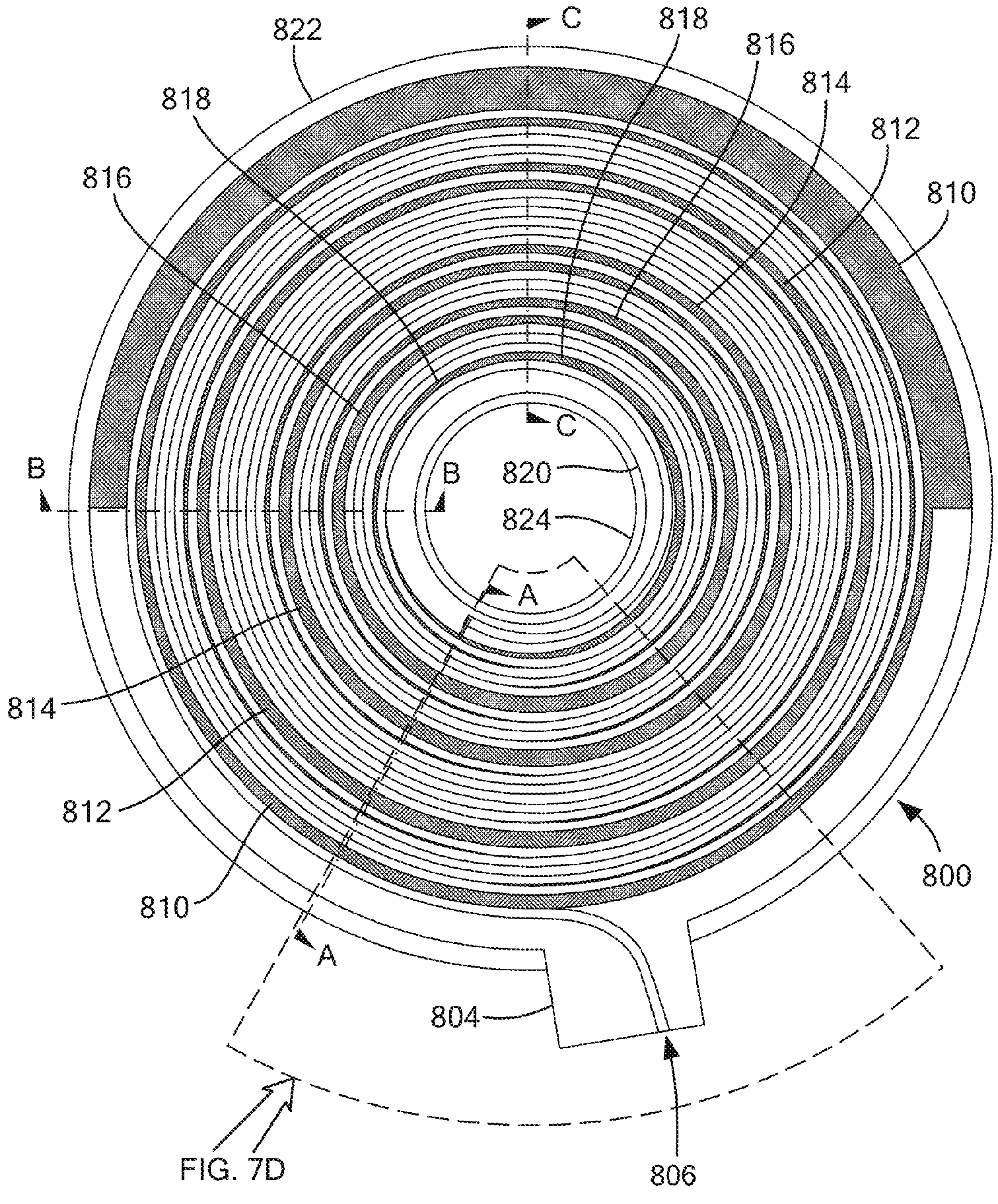
FIG. 7 is a top view of a variable-width spiral-grooved, stacked-plate, double-pancake magnet assembly.
Figure 7A:
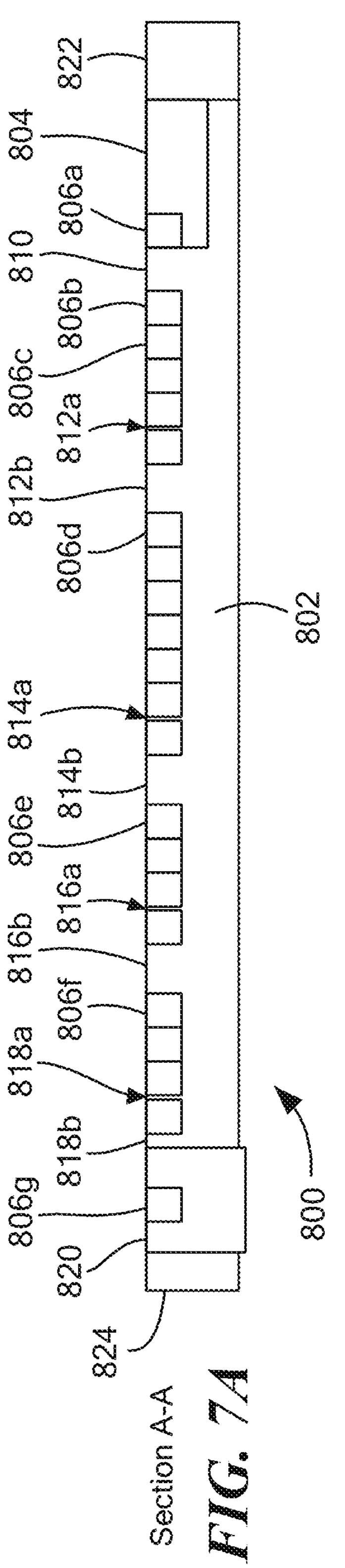
FIG. 7A is a cross-sectional view of the variable-width spiral-grooved, stacked-plate, double-pancake magnet assembly of FIG. 7 taken across lines A-A of FIG. 7.
Figure 7B:
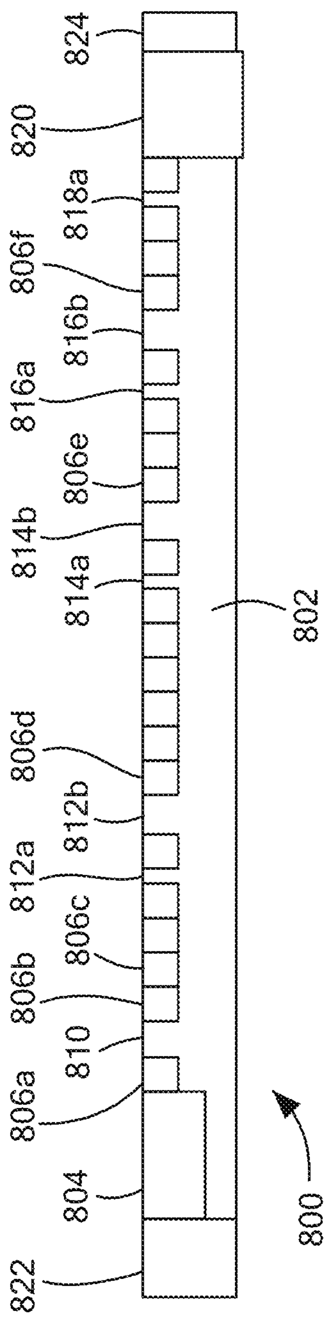
FIG. 7B is a cross-sectional view of the variable-width spiral-grooved, stacked-plate, double-pancake magnet assembly of FIG. 7 taken across lines B-B of FIG. 7.
Figure 7C:
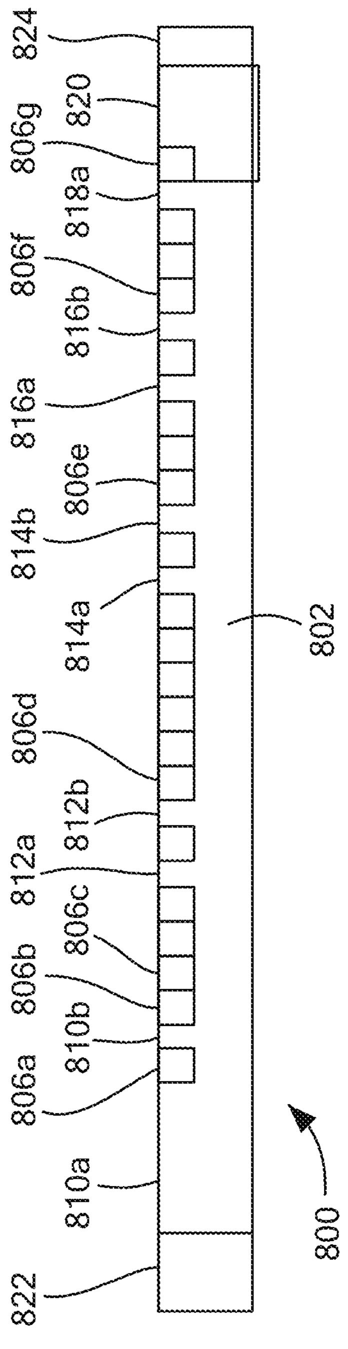
FIG. 7C is a cross-sectional view of the variable-width spiral-grooved, stacked-plate, double-pancake magnet assembly of FIG. 7 taken across lines C-C of FIG. 7.
Figure 7D:
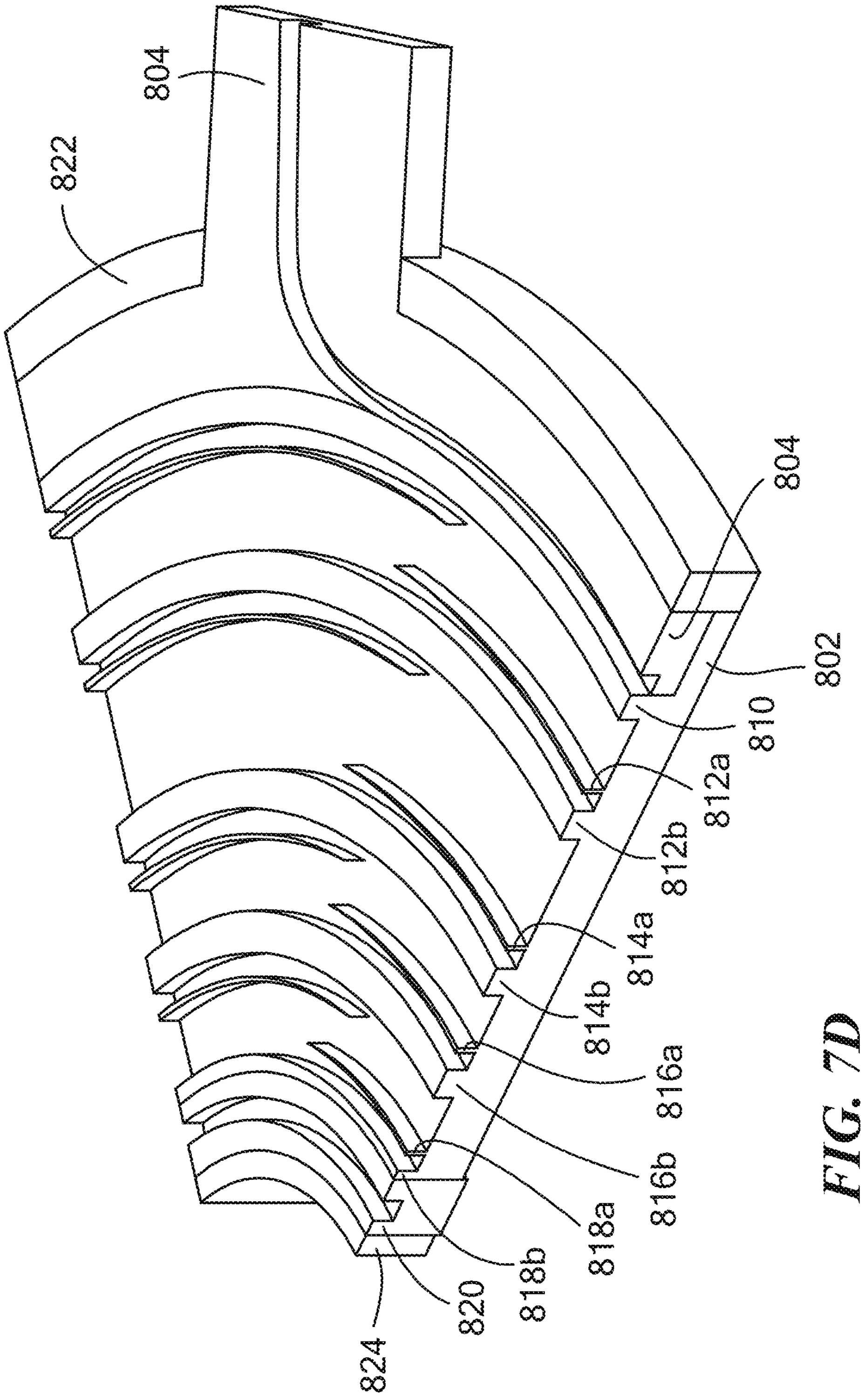
FIG. 7D is a perspective view of a portion of a variable-width spiral-grooved, stacked-plate, double-pancake magnet assembly 7 taken across lines A-A of FIG. 7.

In overview, FIGS. 7-7D illustrate an alternative embodiment of a spiral-grooved, stacked-plate, double pancake assembly in which an HTS tape stack is wound several times directly against itself in some sections or grooves. FIGS. 7-7D also illustrate electrically conductive terminal blocks that span a portion of the perimeter of the outside diameter of a coil and the full perimeter of the inside diameter of the coil. In some embodiments, the inside and outside conductive terminal blocks span only a portion their respective perimeters or span their entire perimeters of the coil. In embodiments, the conductive terminal blocks are provided as copper terminal blocks, however any material that has appropriate electrical conductivity can be used. The spiral-grooved plates can be fabricated in accordance with the techniques described above. In the embodiments of FIGS. 7-7D, it is appreciated that the HTS stack may include a co-wind material as described above and may change its thickness and composition along its length so as to optimize for current density, magnetic field concentration and quench behavior.

It is appreciated that the use of variable-width spiral grooves has several advantages. By varying the width of the grooves, an HTS stack (and co-wind) may be wound directly on itself a given number of times in each radial groove. Doing so allows fine control over the current density distribution in the winding, which can used to reduce magnetic field strength variation and concentration in the HTS tape due to self-fields. Under the assumption that the magnetic field will decrease in magnitude with increasing distance from the center of the assembly 800, it is appreciated that the HTS stack will be able to withstand a greater number of self-winds in each groove with increasing radial distance from the center of the assembly.

Moreover, the use of variable-width spiral grooves eliminates the need to cut (or otherwise form or provide) a "narrow groove" in the plate for the entire length of the HTS tape stack. For purposes of this disclosure, a groove is considered "narrow" when its depth is more than two times its width. Thus, using a plate having variable-width spiral grooves provided therein allows use of narrow HTS tape stacks without a need to use narrow grooves. The design also allows the coil and its structure to be optimized separately with respect to magnetic field generation, self-field experienced by HTS tapes, and mechanical loads, i.e. structural stiffness, locations for welds and fasteners, locations for coolant channels including channels between plates.

Referring now to FIGS. 7-7D in which like elements are provided having like reference designations throughout the several views, a variable-width spiral-grooved, stacked-plate, double-pancake magnet assembly 800 includes a plate 802 in which is disposed a conductive (e.g. copper) terminal block 804 and an HTS tape stack 806 that is contained within several grooves of varying widths and wound against itself to occupy (and ideally to totally occupy—i.e. "fill") the space of each such groove. In particular, the magnet assembly 800 includes walls 810, 812, 814, 816, and 818 that define the various grooves filled with the HTS stack 806 (and any co-wind). The magnet assembly 800 further includes a second, optional copper terminal block 820 along its inner diameter. The magnet assembly 800 also has an outer structural member 822 and an inner structural member 824, which may be made of the same material as the stacked plate 802.

It is appreciated that the number of grooves (hence, the number of walls) in a variable-width spiral-grooved, stacked-plate, double-pancake magnet assembly may vary according to an intended use. It is also appreciated that the number of winds of HTS tape stack and/or co-wind within each groove likewise may vary according to the intended use. Thus, FIG. 7 is only illustrative, and after reading the description provided herein, a person having ordinary skill in the art will appreciate how to adapt the concepts, techniques, and structures described herein to form other embodiments.

Each wall 810, 812, 814, 816, and 818 may include cooling means as described above, or provide structural support against magnetic forces experienced by the HTS tape stack 806, or both.

Each of the walls 810, 812, 814, 816, and 818 may wind substantially around the magnet assembly 800 one or more times (or portions thereof). Furthermore, as may be most clearly seen in FIG. 7D, some (or even all) of the walls have varying (i.e. tapering) thicknesses at different angular positions (see, for example, wall 818 which includes wall portions 818*a*, 818*b*). Thus, the same contiguous wall may, in any given cross-section, appear to have several portions of varying wall thickness.

The total width of a given wall along a given cross-section may be calculated as the sum of the radial extents of each of its portions appearing in the cross-section. This total width may or may not be equal for different walls in different embodiments, and the total width of a given wall may vary as a function of the angular position of the respective cross-section.

FIGS. 7A-7C are cross sectional views taken along lines A-A, B-B, and C-C. respectively, of the magnet assembly 800 of FIG. 7 while FIG. 7D shows a perspective view of a portion of the magnet assembly 800.

With reference now to FIG. 7A, a plate 802 is indicated, with the outer diameter of the magnet assembly 800 at lower left (proximate reference numeral 822) and the inner diameter of the magnet assembly 800 at upper right (proximate reference numeral 824). The copper terminal block 804 is indicated at bottom left as surrounding on two sides a portion 806*a* of the HTS tape stack 806. A third, interior side of the tape stack portion 806*a* abuts the wall 810, while the fourth side of the tape stack portion 806*a* may abut another spiral-grooved magnet assembly (not shown) stacked against it in accordance with the concepts, techniques, and structures disclosed herein.

With reference to FIGS. 7 and 7A, in the particular cross section A-A of the magnet assembly 800, four layers of HTS tape stack 806 are wound against themselves in the groove defined by, and lying between, the wall 810 and the portion 812*a* of the wall 812. Two such layers 806*b* and 806*c* of the HTS tape stack 806 are indicated in FIG. 7A. It is appreciated that layering the HTS tape stack 806 against itself (e.g. in layers 806*b* and 806*c*) may advantageously distribute the self-field strength within the magnet assembly 800 as desired in accordance with a particular application.

A layer of the HTS tape stack 806 is indicated between the portion 812*a* and the portion 812*b* of the wall 812. As indicated above, the wall 812 wraps around the magnet assembly 800 more than once, and thus two portions 812*a* and 812*b* thereof appear in the particular cross-section A-A. The channel between these portions 812*a* and 812*b* is provided to permit a contiguous winding of a single HTS tape stack 806 between the large groove defined by walls 810 and 812*a*, and the large groove defined by walls 812*b* and 814*a*. Thus, it is appreciated that embodiments of the magnet assembly 800 may include a single, narrow stack but nevertheless enable a high inductance winding.

Following the above-described pattern, the portion 812*b* of the wall 812 abuts a layer 806*d* of the HTS tape stack 806. Six layers of the stack are wound against each other in the groove defined by the portion 812*b* and a portion 814*a* of the wall 814. A channel is provided between the portion 814*a* and a portion 814*b* of the same wall 814, through which is wound a layer of the HTS tape stack 806, appearing on the other side of the wall 814 as the layer 806*e*. Three layers of the stack are wound against each other in the groove defined by the portion 814*b* of the wall 814 and a portion 816*a* of the wall 816. A channel is provided between the portion 816*a* and a portion 816*b* of the same wall 816, through which is wound a layer of the HTS tape stack 806, appearing on the other side of the wall 816 as the layer 806*f*. Three layers of the stack are wound against each other in the groove defined by the portion 816*b* of the wall 816 and a portion 818*a* of the wall 818. A channel is provided between the portion 818*a* and a portion 818*b* of the same wall 818, through which is wound a layer of the HTS tape stack 806.

The innermost portion of the magnet assembly 800 may be occupied by a second, optional copper terminal block 820, as indicated in FIG. 7A. This non-superconducting terminal block 820 may be used, in some embodiments, to transition current from (or into) the superconducting HTS tape stack 806. Note that the terminal block 820 may extend completely through the plate 802 to provide an external point of electrical contact. Alternately, the HTS tape stack 806 may continue its winding from the innermost layer 806*g* into an abutting, stacked magnet assembly in accordance with the concepts, techniques, and structures described above. It is appreciated that other configurations of the space between the inner wall (e.g. wall 818) and the inner diameter (e.g. member 824) may be used in various embodiments.

FIG. 7B is a cross-section of FIG. 7 along the line B-B, and indicates a similar pattern with the outer diameter of the magnet assembly 800 at left and the inner diameter at right. Thus, as above the outer member 822 is shown, then the terminal block 804 above the plate 802, then the layer 806*a* of the HTS tape stack 806 which winds through a channel between the terminal block 804 and the wall 810. Next are shown four layers of stack in the groove between the wall 810 and the outer portion 812*a* of the wall 812, then the layer of stack in the channel between the portions 812*a* and 812*b* of the wall 812.

Of particular note is that the portion 812*a* as shown in FIG. 7B is radially thicker than the corresponding portion 812*a* of the same wall 812 as shown in FIG. 7A. Thus, the difference between the cross-sections of these Figures illustrates how the wall 812 has a varying thickness according to different angular directions around the magnet assembly 800, and in particular illustrates the tapered shape of the wall 812. Conversely, the portion 812*b* as shown in FIG. 7B is radially thinner than the corresponding portion 812*b* of the same wall 812 as shown in FIG. 7A. However, the sum of the radial thicknesses of portions 812*a* and 812*b*—i.e., the "total thickness" of the wall 812 along this cross-section—is the same in both Figures and does not vary according to the angular direction of the cross-section.

Having an invariant total thickness may be advantageous in some embodiments; for example, to the extent that each portion 812*a* and 812*b* provides some structural support onto which magnetic forces are shunted, this structural support is uniform and does not vary according to the angular direction. However as explained above, in some embodiments the total thickness of the wall 812 may vary with the angular direction. Moreover, in some embodiments, the width of the tape stack may vary with distance along the stack, requiring the wall thicknesses to be adjusted accordingly.

Continuing radially inward with the description of FIG. 7B, the portion 812*b* of the wall 812 abuts a layer 806*d* of the HTS tape stack 806. Six layers of the stack are wound against each other in the groove defined by the portion 812*b* and a portion 814*a* of the wall 814. A channel is provided between the portion 814*a* and a portion 814*b* of the same wall 814, through which is wound a layer of the HTS tape stack 806, appearing on the other side of the wall 814 as the layer 806*e*. Of note is that, for the reasons described just above, the portion 814*a* is thicker in FIG. 7B than in FIG. 7A, while the portion 814*b* is thinner in FIG. 7B than in FIG. 7A, but the total thickness of these portions is the same.

Three layers of the stack are wound against each other in the groove defined by the portion 814*b* of the wall 814 and a portion 816*a* of the wall 816. A channel is provided between the portion 816*a* and a portion 816*b* of the same wall 816, through which is wound a layer of the HTS tape stack 806, appearing on the other side of the wall 816 as the layer 806*f*. The portion 816*a* is thicker in FIG. 7B than in FIG. 7A, while the portion 816*b* is thinner in FIG. 7B than in FIG. 7A, but the total thickness of these portions is the same.

Three layers of the stack are wound against each other in the groove defined by the portion 816*b* of the wall 816 and a portion 818*a* of the wall 818. A channel is provided between the portion 818*a* and the copper terminal block 820, through which is wound a layer of the HTS tape stack 806. Note that the terminal block 820 may extend completely through the plate 802 to provide an external point of electrical contact. Of further note is that the wall 818 contains only a single portion 818*a* in the cross-section B-B illustrated in FIG. 7B. Finally, material 824 appears along the innermost diameter of the magnet assembly 800.

FIG. 7C is a cross-section of FIG. 7 along the line C-C, and indicates a similar pattern with the outer diameter of the magnet assembly 800 at top and the inner diameter at bottom. Thus, the outer member 822 is shown, then a portion 810*a* of the wall 810. Note that the terminal block 804 is not present in this cross-section, for reasons discussed below. Next, the layer 806*a* of the HTS tape stack 806 winds through a channel between the portion 810*a* and a portion 810*b* of the same wall 810.

Next are shown four layers of HTS tape stack 806 in the groove between the wall 810 and the outer portion 812*a* of the wall 812, including layers 806*b* and 806*c*. Below that is shown the layer of stack in the channel between the portions 812*a* and 812*b* of the wall 812.

Note that the portion 812*a* as shown in FIG. 7C is radially thicker than the corresponding portion 812*a* of the same wall 812 as shown in FIGS. 7A and 7B. Thus, the difference between the cross-sections of these Figures illustrates how the wall 812 has a varying thickness according to different angular directions around the magnet assembly 800, and in particular illustrates the tapered shape of the wall 812. Conversely, the portion 812*b* as shown in FIG. 7C is radially thinner than the corresponding portion 812*b* of the same wall 812 as shown in FIGS. 7A and 7B. However, the total thickness of the wall 812 along the cross-section C-C is the same in all three Figures, and does not vary according to the angular direction of the cross-section.

Continuing radially inward (i.e. downward) with the description of FIG. 7C, the portion 812*b* of the wall 812 abuts a layer 806*d* of the HTS tape stack 806. Six layers of the stack are wound against each other in the groove defined by the portion 812*b* and a portion 814*a* of the wall 814. A channel is provided between the portion 814*a* and a portion 814*b* of the same wall 814, through which is wound a layer of the HTS tape stack 806, appearing on the other side of the wall 814 as the layer 806*e*. Of note again is that, as above, the portion 814*a* is thicker in FIGS. 7A and 7B, while the portion 814*b* is thinner in FIGS. 7A and 7B, but the total thickness of these portions is the same.

Three layers of the stack are wound against each other in the groove defined by the portion 814*b* of the wall 814 and a portion 816*a* of the wall 816. A channel is provided between the portion 816*a* and a portion 816*b* of the same wall 816, through which is wound a layer of the HTS tape stack 806, appearing on the other side of the wall 816 as the layer 806*f*. The portion 816*a* is thicker in FIG. 7C than in FIGS. 7A and 7B, while the portion 816*b* is thinner in FIG. 7C than in FIGS. 7A and 7B, but the total thickness of these portions is the same.

Three layers of the stack are wound against each other in the groove defined by the portion 816*b* of the wall 816 and a portion 818*a* of the wall 818. An inlay channel is provided between the portion 818*a* and the copper terminal block 820 (by material removed from the copper terminal block 820), through which is wound a layer of the HTS tape stack 806. Note that the terminal block 820 may extend completely through the plate 802 to provide an external point of electrical contact. Of further note is that the wall 818 contains only a single portion 818*a* in the cross-section C-C illustrated in FIG. 7C. Finally, material 824 appears along the innermost diameter of the magnet assembly 800.

The inlaid conductive strip or plate 804 provides, among other things, a large contact area between the conductive terminals and the relatively low-conductance material that comprises the back plate 802, and between the HTS tape stack 806 and the conductive terminals. In embodiments, the conductive terminals are provided as copper terminals and the inlaid conductive strip 804 is provided as an inlaid copper strip 804. Use of such a conductive strip facilitates the attainment of a low joint resistance between HTS stack tape 806 and copper terminals.

This feature can be useful when the magnet is being charged and during off-normal events. The contact area is chosen to be large enough so as to ensure that the current density at the interface between copper and backplate material 802 is within acceptable limits (e.g. acceptable joule heating), both for the materials themselves and for the contact resistances between materials. This includes design consideration of potential damage from overheating during off-normal events and consideration of the joule heating distribution in the back plate 802 during charging and its impact on cooling requirements.

The copper plate 804 is deeper than the stack depth or height, to accept the stack and provide additional surface area along which to distribute local heating effects. Thus, for example, in FIG. 7A the portion 806*a* contacts the copper plate 804 along two of its sides, and in FIG. 7C the portion 806*g* contacts the copper terminal block 820 along two of its sides.

It should be understood that various embodiments of the concepts disclosed herein are described with reference to the related drawings. Alternative embodiments can be devised without departing from the scope of the broad concepts described herein. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to disposing a layer or element "A" over a layer or element "B" include situations in which one or more intermediate layers or elements (e.g., layer or element "C") is between layer/element "A" and layer/element "B" as long as the relevant characteristics and functionalities of layer/element "A" and layer/element "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration." Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment," "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description provided herein, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

One skilled in the art will realize the concepts, structures, devices, and techniques described herein may be embodied in other specific forms without departing from the spirit or essential concepts or characteristics thereof. The foregoing embodiments are therefore to be considered in all respects illustrative rather than limiting of the broad concepts sought to be protected. The scope of the concepts is thus indicated by the appended claims, rather than by the foregoing description, and all changes that come within the meaning and range of equivalency of the claims are therefore intended to be embraced therein.

What is claimed is:

1. An apparatus, comprising:

a first electrically conductive plate having a first groove;

a first high-temperature superconductor (HTS) tape stack disposed in the first groove, the first HTS tape stack having a first plurality of turns;

a second electrically conductive plate having a second groove;

a second HTS tape stack disposed in the second groove, the second HTS tape stack having a second plurality of turns;

an electrically conductive connection between the first HTS tape stack and the second HTS tape stack; and at least one coolant channel cut into a surface of the first electrically conductive plate and/or the second electrically conductive plate.

2. The apparatus of claim 1, further comprising an insulator to electrically insulate the first electrically conductive plate from the second electrically conductive plate.

3. The apparatus of claim 1, wherein the electrically conductive connection is formed between an innermost turn of the first HTS tape stack and an innermost turn of the second HTS tape stack.

4. The apparatus of claim 1, wherein the electrically conductive connection is formed between an outermost turn of the first HTS tape stack and an outermost turn of the second HTS tape stack.

5. The apparatus of claim 1, wherein the electrically conductive connection comprises a metal that is not a superconductor at a temperature above 30 degrees Kelvin.

6. The apparatus of claim 5, wherein the metal comprises copper.

7. The apparatus of claim 6, wherein the first electrically conductive plate provides electrical connections between respective turns of the first plurality of turns.

8. The apparatus of claim 1, wherein the first electrically conductive plate comprises a metal or a metal alloy.

9. The apparatus of claim 8, wherein the first electrically conductive plate comprises steel.

10. The apparatus of claim 1, wherein the first HTS tape stack comprises rare-earth barium copper oxide.

11. The apparatus of claim 1, wherein the first groove comprises at least first and second turns, wherein the first turn has a first width and the second turn has a second width, wherein the second width is greater than the first width.

12. The apparatus of claim 11, wherein the second turn of the first groove comprises a plurality of turns of the first HTS tape stack.

13. A magnet, comprising:

a first electrically conductive plate having a first groove;

a first high-temperature superconductor (HTS) tape stack disposed in the first groove, the first HTS tape stack having a first plurality of turns;

a second electrically conductive plate having a second groove;

a second HTS tape stack disposed in the second groove, the second HTS tape stack having a second plurality of turns;

an electrically conductive connection between the first HTS tape stack and the second HTS tape stack; and at least one coolant channel cut into a surface of the first electrically conductive plate and/or the second electrically conductive plate, wherein the first electrically conductive plate provides electrical connections between respective turns of the first plurality of turns, wherein the second electrically conductive plate provides electrical connections between respective turns of the second plurality of turns.

14. The magnet of claim 13, further comprising an insulator to electrically insulate the first electrically conductive plate from the second electrically conductive plate.

15. A fabrication method, comprising:

forming a first electrically conductive plate having a first groove;

disposing a first high-temperature superconductor (HTS) tape stack in the first groove, forming a second electrically conductive plate having a second groove;

disposing a second HTS tape stack in the second groove;

forming at least one coolant channel into a surface of the first electrically conductive plate and/or the second electrically conductive plate; and electrically connecting the first HTS tape stack and the second HTS tape stack.

16. The fabrication method of claim 15, wherein forming the at least one coolant channel comprises cutting the at least one coolant channel into the surface.

* * * * *